US011234039B2

(12) United States Patent
Lawrence et al.

(10) Patent No.: US 11,234,039 B2
(45) Date of Patent: Jan. 25, 2022

(54) VOICE-CONTROLLED MULTIMEDIA DEVICE

(71) Applicant: Amazon Technologies, Inc., Seattle, WA (US)

(72) Inventors: Mark Lawrence, Bainbridge Island, WA (US); Balsa Laban, Mercer Island, WA (US); Anna Chen Santos, Mountain View, CA (US); Joseph Pedro Tavares, Kenmore, WA (US); Miroslav Ristic, Santa Clara, CA (US); Valere Joseph Vanderschaegen, Kalama, WA (US); Trausti Thor Kristjansson, San Jose, CA (US); Srivatsan Kandadai, San Jose, CA (US); Donald L. Cantrell, Jr., Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/781,855

(22) Filed: Feb. 4, 2020

(65) Prior Publication Data

US 2020/0177945 A1 Jun. 4, 2020

Related U.S. Application Data

(62) Division of application No. 15/919,096, filed on Mar. 12, 2018, now Pat. No. 10,560,737.

(51) Int. Cl.

*H04N 21/422* (2011.01)
*H04N 21/41* (2011.01)

(Continued)

(52) U.S. Cl.

CPC ....... *H04N 21/42203* (2013.01); *G06F 3/167* (2013.01); *G10L 15/22* (2013.01);

(Continued)

(58) Field of Classification Search

CPC ......... H04N 21/42203; H04N 21/4222; H04N 21/4126; H04N 21/4432; H04N 21/44231;

(Continued)

(56) References Cited

U.S. PATENT DOCUMENTS 8,271,287 B1 * 9/2012 Kermani .......... H04N 21/42222 704/275
8,826,444 B1 * 9/2014 Kalle .................... G06F 21/552 726/26

(Continued)

FOREIGN PATENT DOCUMENTS

EP 2680596 1/2014
EP 22680596 ‡ 1/2014

(Continued)

OTHER PUBLICATIONS

U.S. Appl. No. 15/919,108, U.S. Patent Application, filed Mar. 12, 2018, Titled: Detection of TV State Using Sub-Audible Signal.‡

(Continued)

*Primary Examiner* — Akwasi M Sarpong
(74) *Attorney, Agent, or Firm* — Kilpatrick Townsend & Stockton LLP

(57) ABSTRACT

A computer-implemented method includes receiving, at a microphone of a voice-controlled device, a speech input from a user and determining, by the voice-controlled device, that a power state of an AV display device that is coupled to the voice-controlled device is an ON or OFF state. Based on the user intent determined from the speech input and the power state of the AV display, the voice-controlled device sends data to the AV display device to switch the AV display device ON or OFF. The method can further include receiv- (Continued)

ing, by the voice-controlled device, content from a content source location and sending the content to the AV display device via an AV port.

20 Claims, 24 Drawing Sheets

(51) Int. Cl.
*G10L 15/22* (2006.01)
*G06F 3/16* (2006.01)

(52) U.S. Cl.
CPC ..... *H04N 21/4126* (2013.01); *H04N 21/4222* (2013.01); *G10L 2015/223* (2013.01)

(58) Field of Classification Search
CPC ....... H04N 21/43635; H04N 21/42221; H04N 21/42222; G06F 3/167; G10L 15/22; G10L 2015/223
USPC .................................... 704/500, 9, 253, 275
See application file for complete search history.

(56) References Cited

U.S. PATENT DOCUMENTS

| | | | | |
|---|---|---|---|---|
| 9,728,188 | B1 * | 8/2017 | Rosen | G10L 25/51 |
| 10,142,578 | B2 * | 11/2018 | Du | H04N 21/42204 |
| 10,365,620 | B1 * | 7/2019 | Raeber | H04W 4/80 |
| RE48,423 | E * | 2/2021 | Lee | G08C 19/28 |
| 2006/0009985 | A1 * | 1/2006 | Ko | H04S 3/00 704/500 |
| 2007/0086579 | A1 * | 4/2007 | Lorello | H04M 3/42263 379/45 |
| 2008/0089534 | A1 * | 4/2008 | Park | H04N 21/42215 381/105 |
| 2011/0289541 | A1 * | 11/2011 | Yen | H04N 7/163 725/110 |
| 2012/0245932 | A1 | 9/2012 | Ouchi et al. | |
| 2012/0314597 | A1 * | 12/2012 | Singh | H04L 65/80 370/252 |
| 2012/0328090 | A1 * | 12/2012 | Macwan | H04W 4/24 379/114.03 |
| 2013/0152092 | A1 * | 6/2013 | Yadgar | G10L 15/22 718/102 |
| 2013/0219087 | A1 * | 8/2013 | Du | G09G 5/006 710/16 |
| 2014/0240593 | A1 * | 8/2014 | Tsinberg | H04N 7/015 348/474 |
| 2015/0066479 | A1 * | 3/2015 | Pasupalak | G06F 40/40 704/9 |
| 2015/0379455 | A1 * | 12/2015 | Munzer | G06F 3/04842 705/7.15 |
| 2016/0163315 | A1 * | 6/2016 | Choi | H04L 41/22 704/275 |
| 2016/0379632 | A1 * | 12/2016 | Hoffmeister | G10L 25/87 704/253 |
| 2017/0024465 | A1 * | 1/2017 | Yeh | G10L 25/54 |
| 2017/0116990 | A1 * | 4/2017 | Faaborg | G10L 15/1815 |
| 2018/0152557 | A1 * | 5/2018 | White | G10L 15/26 |
| 2018/0167762 | A1 * | 6/2018 | Hatambeiki | H04N 21/4126 |
| 2018/0182389 | A1 * | 6/2018 | Devaraj | H04L 51/046 |
| 2018/0321904 | A1 ‡ | 11/2018 | Bailey | H04R 3/04 |
| 2019/0019504 | A1 * | 1/2019 | Hatambeiki | G10L 15/22 |
| 2019/0033446 | A1 * | 1/2019 | Bultan | G01S 15/66 |

FOREIGN PATENT DOCUMENTS

| | | | |
|---|---|---|---|
| EP | 2960882 | ‡ | 12/2015 |
| EP | 3142107 | ‡ | 3/2017 |
| JP | 2006337513 | | 12/2006 |
| KR | 20180024927 | ‡ | 3/2018 |
| WO | 2016081636 | | 5/2016 |

OTHER PUBLICATIONS

JP Application No. EP19713293.9, Office Action, dated Apr. 7, 2021, 12 pages.

EP Application No. JP2020-549065, Notice of Allowance, dated Apr. 9, 2021, 6 pages.

CN App. No. 201980013572.4, "Office Action," dated Feb. 2, 2021, 7 pages.

U.S. Appl. No. 15/919,096, "Notice of Allowance,"dated Sep. 25, 2019, 14 pages.

U.S. Appl. No. 15/919,108, "Detection of TV State Using Sub-Audible Signal," filed Mar. 12, 2018, 92 pages.

HDMI Licensing et al., "Supplement 1 Consumer Electronics Control (CEC)", Available online at URL:https://web.archive.org/web/20130317190902/http://xtreamerdev.googlecode.com/fi1es/CEC_Specs.pdf, Mar. 17, 2013, 104 pages.

PCT/US2019/021579, "International Search Report and Written Opinion," dated May 22, 2019, 15 pages.

CN Application No. CN201980013572.4, Notice of Decision to Grant, dated Apr. 7, 2021, 4 pages.

EP Application No. EP19713293.9, Office Action, dated Oct. 14, 2021, 10 pages.

* cited by examiner
‡ imported from a related application

VOICE-CONTROLLED MULTIMEDIA DEVICE

CROSS-REFERENCE TO RELATED APPLICATIONS

This application is a divisional application of U.S. patent application Ser. No. 15/919,096, filed Mar. 12, 2018, issued to U.S. Pat. No. 10,560,737 on Feb. 11, 2020, and entitled "VOICE-CONTROLLED MULTIMEDIA DEVICE," the content of which is herein incorporated by reference in its entirety.

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used to request content to be played on an audio and/or video system but due to the increasing topological complexity of many home audio-video systems, there remains a need for voice-controlled devices that can reliably play content on multiple systems in accordance with a user's voice commands.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Embodiments of this disclosure relates to, among other things, systems, methods, computer-readable media, techniques, and methodologies for voice-controlled multimedia devices (VCMDs), also referred to herein as voice-controlled devices. Embodiments include devices that can be voice-controlled and respond to audible instructions. In response to the audible instructions, the VCMD can output digital content for presentation at the internal speakers of the VCMD or at another external device, e.g., at a user's television or one or more external speakers connected to an audio-video receiver, referred to herein broadly as the TV-AVR system. In some embodiments, the VCMD can control the user's other electronic devices, e.g., televisions and audio video systems, for presenting the digital content in accordance with the user's request. As a result, embodiments of the VCMD may be configured to control multiple electronic devices in an ambient environment without having to be manipulated or pointed at the respective devices, and may be configured to react to voice-based instructions, thereby reducing or removing a need for users to physically manipulate the device as is the case with a typical remote control.

To control the other electronic devices, certain embodiments of the VCMD may include a set of one or more infrared (IR) light sources, such as light emitting diodes (LEDs), that can be used to send IR signals to wirelessly communicate with other electronic devices of the TV-AVR system. In other embodiments, the VCMD can also include the capability of issuing control commands via one or more AV ports, e.g., via one or more high-definition multimedia interface (HDMI) ports.

Figure 1:
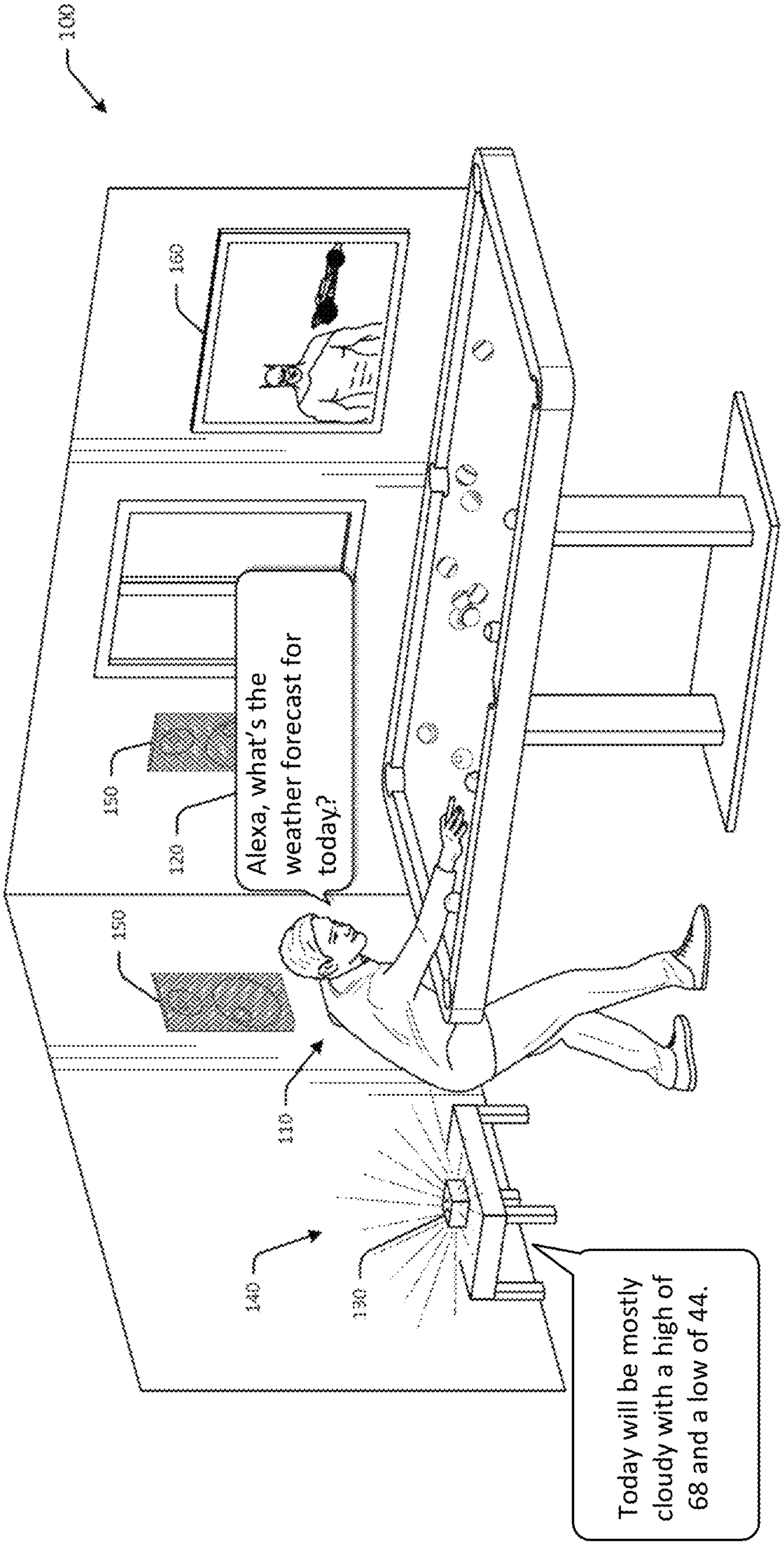
FIG. 1 shows an example use case and schematic drawing of a voice-controlled multimedia device in accordance with one or more embodiments of the disclosure.

FIG. 1 shows an example use case 100 and schematic drawing of VCMD 130 in accordance with one or more embodiments of the disclosure. A user 110 may be in an ambient environment with a number of electronic devices, such as an audio system 150, a television 160, wirelessly controlled lighting (not shown), and other electronic devices configured to be controlled remotely. A VCMD 130 may be in the ambient environment of the user 110, such as on a table, in a cabinet, or elsewhere in the ambient environment.

The user 110 may verbally interact with the VCMD 130 to request content from the VCMD, which itself can be connected to one or more digital content sources, e.g., to one or more audio content sources and/or video content sources via a wide area or local area computer network. For example, the user 110 may utter a phrase 120 (also referred to herein as a user utterance or speech input) that includes an instruction, command, or request, such as "Alexa, what's the weather forecast for today?"

The VCMD 130 may detect the speech input from the user 110 and may determine a meaning of the phrase 120. For example, the VCMD 130 may detect a trigger word or a wakeword of "Alexa," or another trigger word, and may subsequently begin monitoring for voice commands using one or more microphones. In some embodiments, detection and/or processing of the speech input may be done locally at the VCMD 130, while in other embodiments the VCMD 130 may communicate with one or more remote server computers to determine whether the speech input includes one or more voice commands. In some embodiments, the trigger word may be detected and determined locally, while the full speech input including potential voice commands may be processed remotely. In other embodiments, the full speech input can be processed entirely locally or using any combination of local and/or remote speech processing services as described in further detail below in reference to FIG. 3.

After determining or receiving the meaning of the phrase 120 in the example of FIG. 1, the VCMD 130 may initiate one or more response actions. In this example, the VCMD 130 may determine that the user 110 wants to hear an audio stream relating to a local weather forecast. In response to this determination, the VCMD 130 may then detect the state of the external AV system to determine whether or not any open audio channels, i.e., any external devices that are powered on and possess a speaker that can transmit audio, e.g., the internal speaker of television 160 or the speakers of the audio system 150. In some instances, if the VCMD 130 detects that there are no open audio channels on the external devices, the VCMD may present the audio content locally, using an internal speaker of the VCMD 130. In some instances, if the VCMD 130 detects that the television does include an open audio channel, e.g., the television is in the ON state and not muted, the VCMD 130 can send a control signal to switch the AV input of the television and may present the audio content on the internal speaker of the television 160. For example, the VCMD 130 can connect to a content source via an AV port and stream the content to the television 160 using an AV connection between the VCMD 130 and the television 160, e.g., via a high definition multimedia interface (HDMI) port, or the like.

Figure 2:
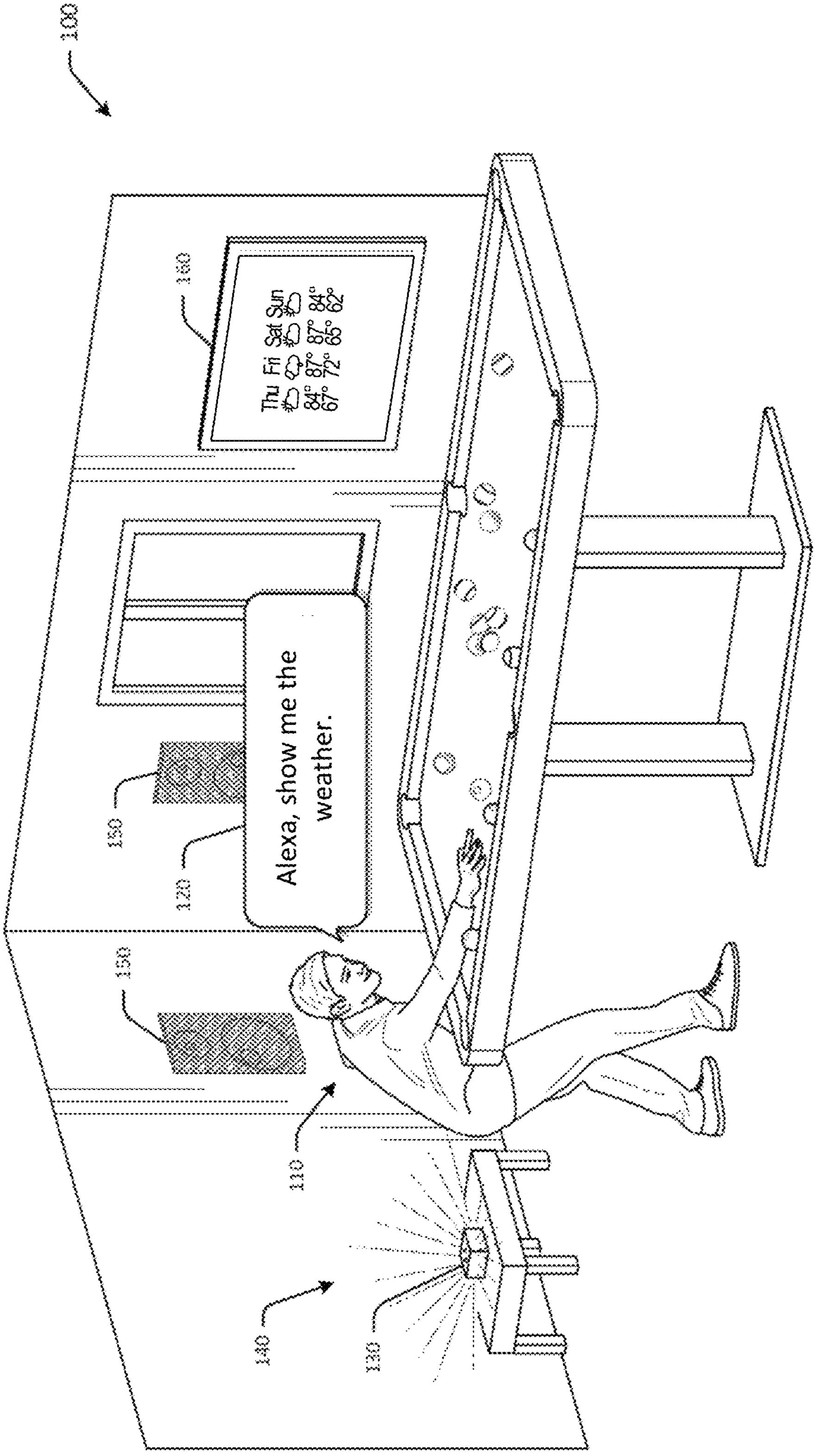
FIG. 2 shows an example use case and schematic drawing of a voice-controlled multimedia device in accordance with one or more embodiments of the disclosure.

In other instances, as shown in FIG. 2, the user 110 may utter a phrase that implies an desire to view video content associated with the utterance, e.g., by saying, "Alexa, show me the weather," the user is indicating that they would like to view a weather forecast. As before, after determining or receiving the meaning of the phrase 120, the VCMD 130 may initiate one or more response actions. In this example, the VCMD 130 may determine that the user 110 wants to view a video stream relating to the weather forecast. The VCMD 130 may then determine the state of the external AV system to determine whether or not any external devices include an open video channel, e.g., whether or not the television 160 is in an ON state and set to an input that allows streaming video content to be displayed from the VCMD 130. In some instances, if the VCMD 130 detects that the television 160 is in the OFF state, the VCMD 130 can initiate a control sequence that can first turn on the television 160 and then set the television AV input to the input associated with the VCMD 130. Next the VCMD 130 can stream the video content to the screen of the television 160 as shown in FIG. 2, e.g., via an HDMI port, or the like.

Figure 12:
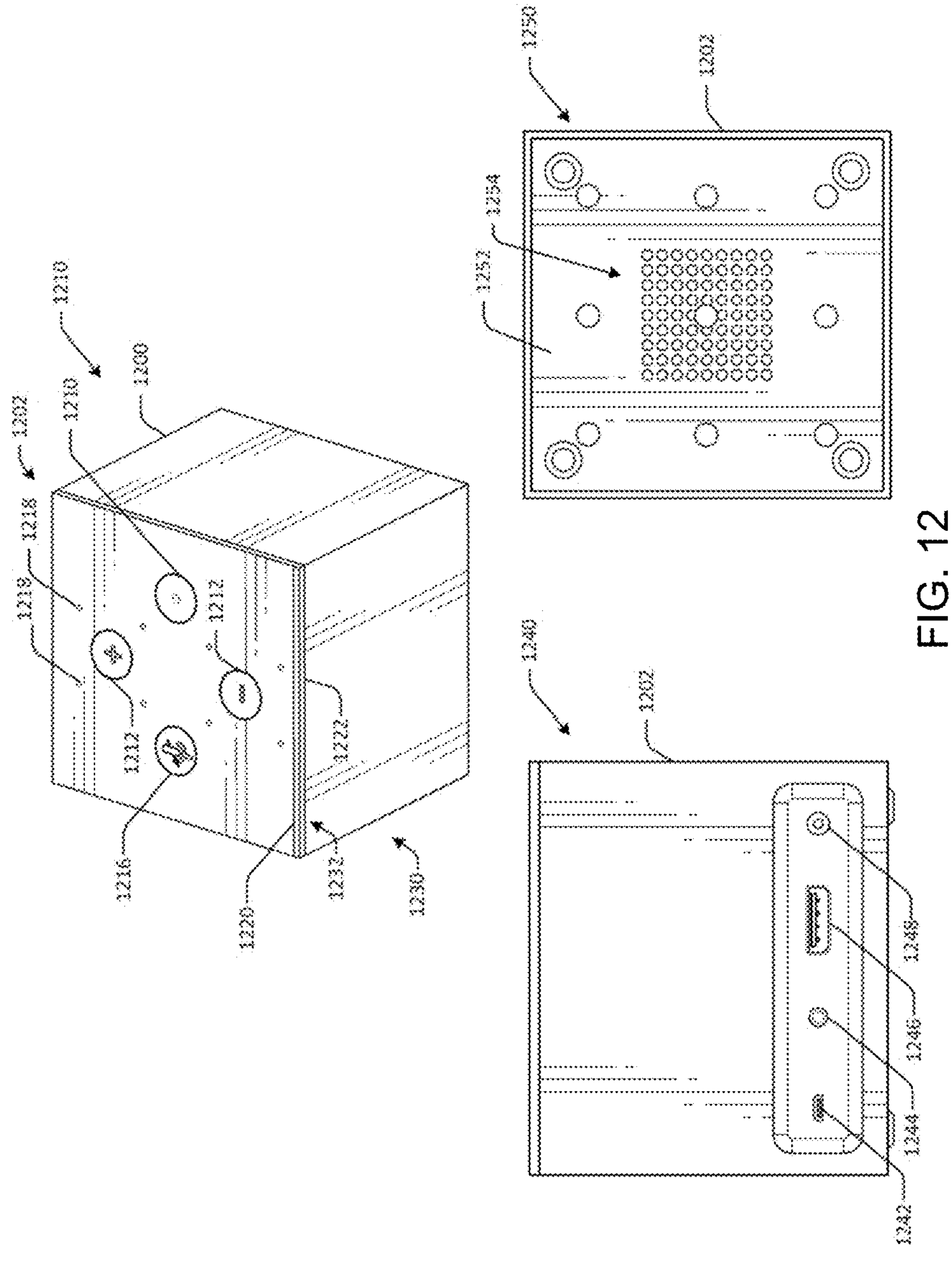
FIG. 12 schematically depicts a voice-controlled multimedia device in various views in accordance with one or more embodiments of the present disclosure.
Figure 13:
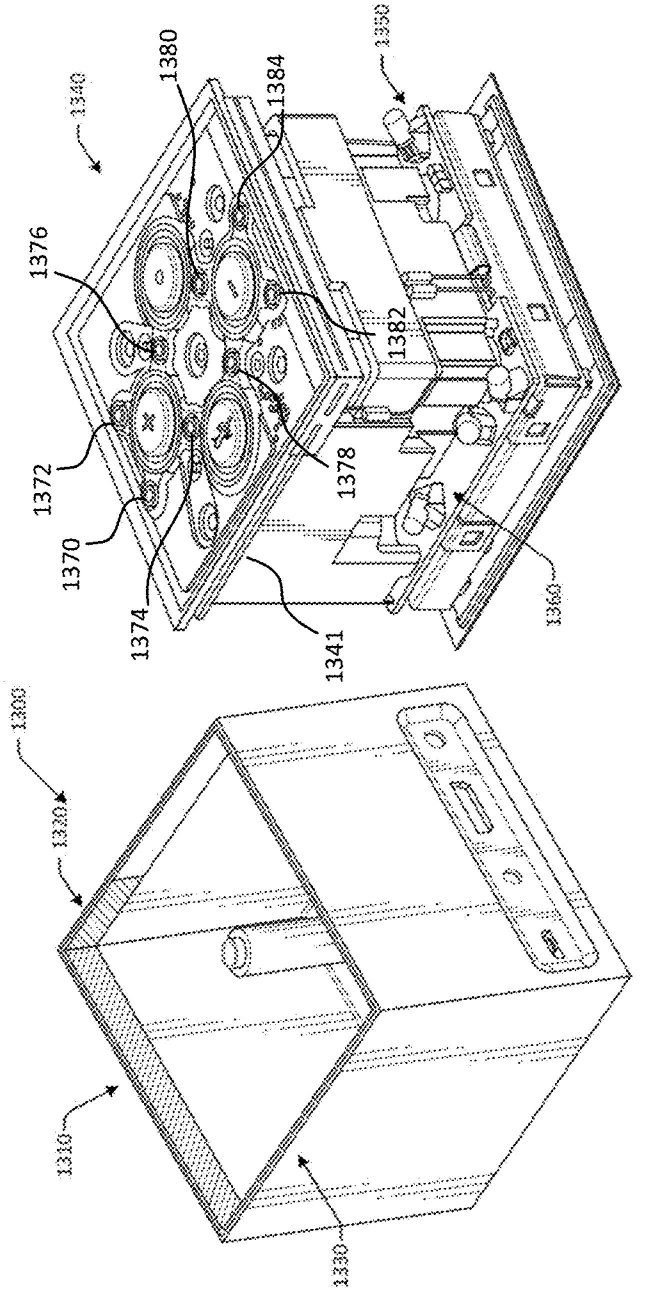
FIG. 13 shows another view of a voice-controlled multimedia device in accordance with one or more embodiments of the disclosure.
Figure 14:
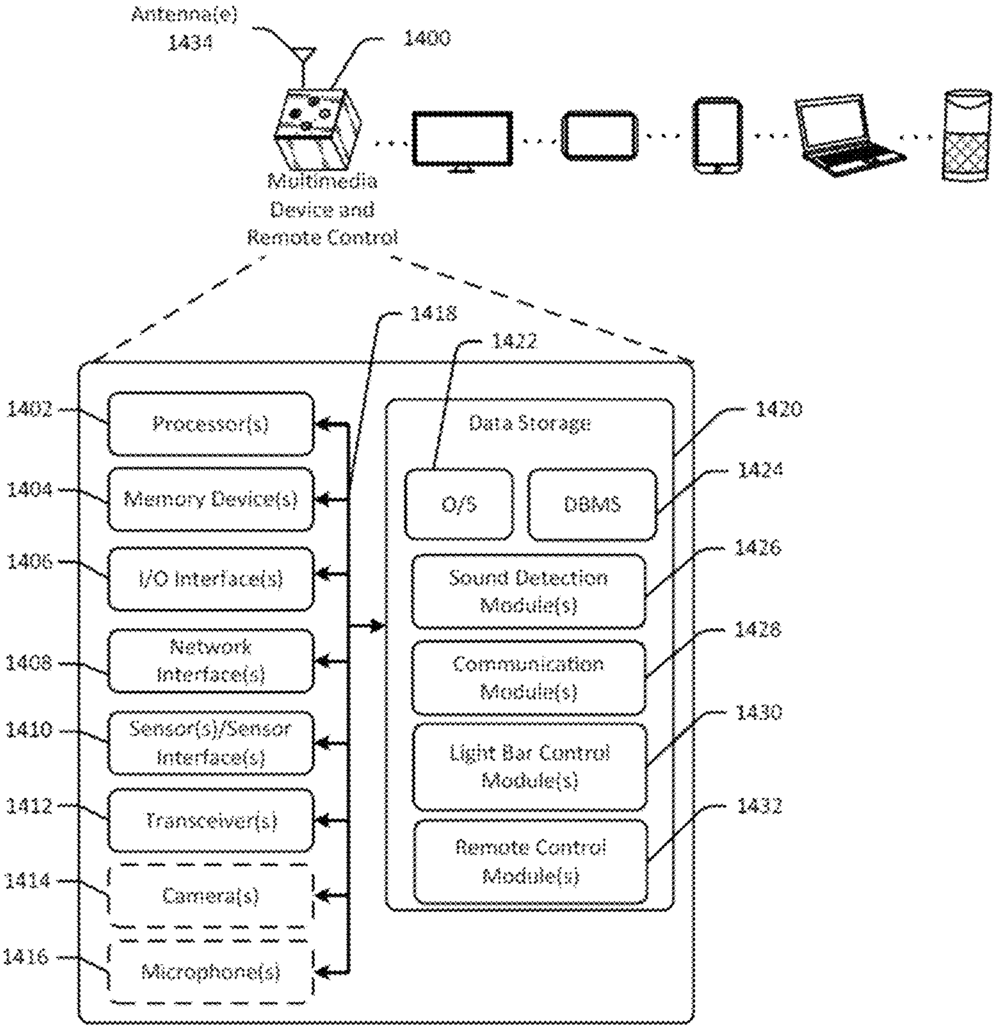
FIG. 14 is a schematic block diagram of one or more illustrative voice-controlled multimedia devices in accordance with one or more embodiments of the disclosure.

To implement the response actions, the VCMD 130 can send one or more commands or instructions via an AV interface, e.g., HDMI or the like or may use a wireless channel, e.g., an infrared optical channel, similar to a universal remote control device. Accordingly, the VCMD 130 may include a housing with a number of sidewalls, one or more AV output port(s) accessible through one or more of the sidewalls, and a set of one or more IR LEDs that are configured to emit infrared light through one or more of the sidewalls. For example, FIGS. 12-14 show one example of a VCMD that includes IR LEDs. In some embodiments, the infrared light can be emitted three hundred sixty degrees about the VCMD 130 so as to provide infrared coverage of a relatively large portion of the ambient environment. In some embodiments, the VCMD 130 may include infrared LEDs oriented or positioned in opposite directions, so as to increase infrared LED coverage of the ambient environment.

The VCMD 130 may also include an AV interface port, e.g., a VGA port, DVI port, and/or a HDMI port configured to output video content, e.g., standard resolution content, high-definition content, ultra-high-definition digital content (e.g., 4K resolution, UHD resolution, etc.). The VCMD 130 may be connected to the television 160 wirelessly or via the AV port and may cause streaming of the requested content with visual presentation of the content at the television 160.

Figure 3:
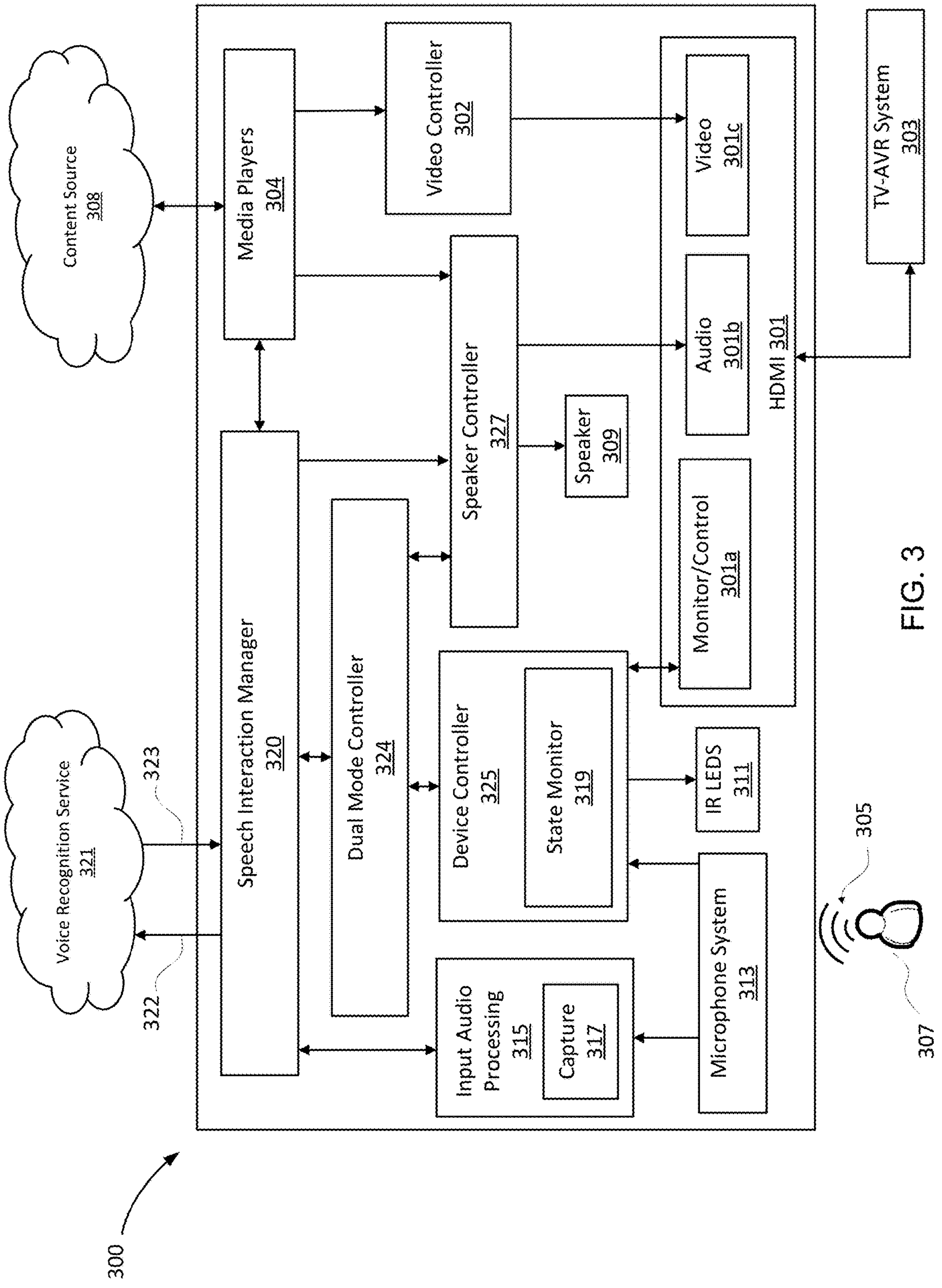
FIG. 3 shows a block diagram of a voice-controlled multimedia device in accordance with one or more embodiments of the disclosure.

FIG. 3 shows a block diagram of a VCMD 300 according to certain embodiments. The internal architecture of the VCMD 300 is configured to provide a multi-step user input and content delivery process that begins with the reception of speech input such as a user utterance or command and ends with content being delivered to one or more output systems of VCMD 300 and/or TV-AVR system 303. As introduced above, VCMD 300 can be connected directly to a television system (TV) or can be connected indirectly to a TV by way of an audio-video receiver system (AVR), with the AVR having one or more external speakers. For the sake of conciseness, the combined acronym TV-AVR is used herein to refer to both a stand-alone TV and also to a system with a more complex topology, such as a TV connected to an AVR with one or more external speakers.

To provide a connection to TV-AVR system 303, VCMD 300 can include one or more AV ports, e.g., HDMI port 301. The HDMI port 301 can receive one or more electrical interconnects, such as an HDMI cable. For simplicity, the interconnects and associated circuitry for the HDMI port 301 are grouped into three logical sub-blocks including video block 301*c*, audio block 301*b*, and monitor/control block 301*a*. The video block 301*c* of HDMI port 301 can receive video data and transmit the video data to the TV-AVR system 303. Likewise, the audio block 301*b* can receive audio data and transmit the audio data to the TV-AVR system 303. Monitor/Control block 301*a* can monitor one or more data lines of the HDMI port to determine the state of the TV-AVR System 303. Monitor/Control block 301*a* can also be used to provide HDMI data, e.g., in the form of Consumer Electronics Control (CEC) commands, to the TV-AVR system 303 to control the state of the TV-AVR system 303. Various CEC commands are available such as ON/OFF, volume control, mute/unmute, AV input selection, etc.

In addition, to control the state of TV-AVR system 303 in the case where components of the system may not be CEC compatible, VCMD 300 can be equipped with one or more IR transmitters, e.g., IR LEDS 311. To control one or more components of the TV-AVR system 303, the IR transmitters can output data in the form of IR codes/signals that are then received by one or more IR receiver(s) that are operably connected to the TV-AVR system (not shown). Various control functions are possible such as ON/OFF, volume control, mute/unmute, AV input selection, etc.

VCMD 300 includes a microphone system 313 that is configured to monitor the ambient sounds within an area around VCMD 300, e.g., within a room of a house, and to detect whether the ambient sounds include a speech input, e.g., a user utterance 305 from a user 307. In response to the user utterance 305, VCMD 300 can play content on an output system that is either internal to VCMD 300, e.g., internal speaker 309 or can play content on an external system, e.g., TV-AVR system 303. The content associated with an utterance can be purely visual, purely audio, or can be multimedia, such as audiovisual content. The content can be sourced from one or more remote server computers and played by one or more media player(s) 304. The content sources can be located e.g. at a remote voice recognition service 321 and/or at a remote content source 308 either of which can be accessible via the user's local area network or via the Internet.

VCMD 300 is configured to route the user-requested content to either the internal speaker 309 of the VCMD 300 or to the TV-AVR system 303 depending both on the details of the user utterance 305 and on the current state of the TV-AVR system 303, e.g., whether or not the TV-AVR system 303 is currently powered ON or OFF. The ability of the VCMD 300 to route user-requested content to either the speaker 309 or the TV-AVR system 303 is referred to herein as "dual-mode functionality" because it allows the VCMD 300 to operate in two modes that otherwise would require two separate devices to facilitate. In a first mode, the VCMD 300 can operate like an audio playback voice-controlled device that includes audio-only output. In a second mode, the VCMD 300 can operate as a streaming digital media player that is operably coupled to one or more displays (e.g., a TV) and can be operated by a voice-controlled remote.

As used herein the terms ON power state and OFF power state refer to the power state of one or more components of the TV-AVR system. For example, the ON power state refers to a state where all the necessary components for viewing content on the screen of the TV are provided with power. Likewise, the OFF state is the power state of a TV that results when a user toggles a power switch when the TV is initially in the ON state. As such, the term "OFF state" can include both unpowered states and/or so-called standby states where the display of the TV may be powered off, but some limited number of other components within the TV may still be receiving power. For example, in a standby state, a subset of TV components may be listening for CEC control commands and the TV can be switched from the OFF state to the ON state when HDMI data associated with a "Turn TV ON" CEC command is received.

As used herein, the terms "in focus" and "not it focus" refer to states of the TV-AVR system, specifically whether or not the TV-AVR system is powered on with its active AV input port(s) set to the VCMD. For example, in the system shown in FIG. 3, assume that TV-AVR system 303 includes an audio-video display device such as a TV, computer monitor, DLP projector or the like, and an AVR with one or more external speakers. Furthermore assume that the AV output port of VCMD 300 (VCMD_OUT_1) is connected via HDMI to an input port of the AVR (AVR_IN_1), and then an output port of the AVR (AVR_OUT_1) is connected to an input port of the TV (TV_IN_1), i.e., the HDMI connection of the entire system can be described as follows: VCMD_OUT_1→AVR_IN_1→AVR_OUT_1→TV_IN_1. In this connection topology, to be considered "in focus" the active input port of the AVR should be set to AVR_IN_1, the active output port of the AVR should be set to AVR_OUT_1, and the active input port of the TV should be set to TV_IN_1. In such a case, the VCMD can be considered to be "in focus" if the power setting of both the TV and the AVR is set to the ON state. On the other hand, if either the AVR or the TV is set to a power OFF state, the VCMD can be considered to be "not in focus." Likewise, if both the TV and the AVR are in the power ON state but the currently active input/output ports of any of the TV-AVR system components are set to something other than VCMD_OUT_1→AVR_IN_1→AVR_OUT_1→TV_IN_1, then the VCMD can also be considered to be "not in focus." As described in more detail below, if the user utterance implies a desire to play content on the TV-AVR system, the VCMD can provide the appropriate control signals, e.g., via IR LEDS 311 and/or HDMI port 301, to move VCMD 300 from a "not in focus" state to an "in focus" state and such a control signal generally can include ON/OFF control signals as well as active input switching/activation signals.

Returning to FIG. 3, the VCMD 300 can include an audio input section that includes microphone system 313 and input audio processing system 315. Microphone system 313 can be a microphone array system that employs an arrangement of microphones that work together to allow the VCMD 300 to locate the user in an otherwise noisy room, e.g., by using a multi-microphone beam forming technique. The microphone system 313 can also work together to improve the quality of the detected audio signal, e.g., by a detection scheme that results in echo cancellation. One possible arrangement of microphones within a microphone system 313 according to certain embodiments is described in further detail below in reference to FIG. 13.

The audio input section of VCMD 300 further includes input audio processing system 315 that receives audio signals form the microphone system 313 and performs additional signal processing. In addition, the audio processing system can control the beamforming and echo cancellation capabilities of the microphone array. Input audio processing system 315 also includes a wakeword detection service that is configured to receive the audio input signal from the microphone system 313, also referred to herein as a microphone signal, and to detect whether or not a wakeword was present in the speech input that was received by the microphone system 313. Input audio processing system 315 includes audio capture subsystem 317 that, upon detection of the wakeword, can capture the speech input associated with the user utterance and digitize it, e.g., in the form of digital audio data such as PCM data or the like, also referred to herein as utterance data.

Input audio processing system 315 further includes a device controller 325 having state monitor subsystem 319 that can receive the microphone signal from one or more microphones of the microphone system 313 and can determine the state of the TV-AVR system based on the content of the microphone signal. For example, VCMD 300 can send an audio probe signal to one or more speakers of the TV-AVR system and the state monitor subsystem 319 can be used to determine whether or not the probe signal is present in the microphone signal in an effort to determine whether or not the VCMD is currently ON/OFF or in focus/not in focus on the TV-AVR system.

VCMD 300 further includes a speech interaction manager (SIM) 320 that can coordinate one or more interactions amongst the subsystems of VCMD 300 and also can coordinate the interaction of the VCMD 300 with one or more external systems. According to certain embodiments, SIM 320 can exchange data with a cloud-based voice recognition service (VRS) 321 such as Amazon Alexa. SIM 320 can also coordinate with a dual mode controller (DMC) 324 to obtain the current state of the TV-AVR system, also referred to herein as the TV-AVR system "context." For example, in response to a user utterance 305, the SIM 320 can query the DMC 324 for the TV-AVR system state. DMC 324 can then provide the system state or can obtain it from the device controller 325. After SIM 320 receives the TV-AVR system state, it can send an event message 322 to VRS 321 that includes both the TV-AVR system state and the utterance data. VRS 321 can then use a number of voice processing techniques to identify the user intent from the user utterance data.

According to certain embodiments, VRS 321 can be one or more remote server computers running a number of voice recognition services, natural language processing (NLP) services, natural language understanding (NLU) services, and the like. According to certain embodiments, rather than being a cloud-based system, VRS 321 can be internal to the VCMD. The VRS 321 can perform automatic speech recognition (ASR) on the utterance data and generate recognition result data, thereby converting the PCM data to a text string representing the words of the utterance. The recognition result data can then be passed to a NLU module (not shown) within VRS 321 where NLU processing is applied to determine the user intent from the recognition result data. VRS 321 then takes both the determined user intent and the current TV-AVR state and generates digital response data 323 that can be structured as a set of directives that are sent back to SIM 320.

As described in more detail below, the directives can include a set of commands and/or data that represent content, instructions, commands, or any other data that allow the components of the VCMD 300 to provide content in accordance with the user intent as determined by the VRS 321. For example, the directives can include data that provides a data element, referred to herein as a TV-AVR request indication, that indicates the requested content is video content. The directives can also include a device control directive that includes an instruction to turn ON the TV and set the active input of the TV to VCMD 300. In addition, the directives can include embedded content, e.g., text-to-speech (TTS) audio data that is generated by VRS 321 in response to the user utterance. For example, in response to the utterance, "Alexa, play Interstellar," the VRS 321 can generate a TTS audio file that includes the response such as, "OK, here's Interstellar."

The content embedded within the directives can also include one or more media payloads that represent media to be played on the TV-AVR system 303, e.g., the data associated with one or more visual graphics, such as cards, to be displayed on the screen of the TV-AVR system 303. In some cases, the directives can also include a playback instruction coupled with content source location identifier such as a url that directs a media player within media players module 304 to launch and begin streaming the content located at the url.

According to certain embodiments the SIM 320 can execute the set of directives and exchange one or more messages with DMC 324 to coordinate what output location should be used (VCMD internal speaker 309 or TV-AVR system 303), as described in further detail below in reference to FIGS. 4-9.

According to certain embodiments, the directives 323 can include an indication, referred to herein as a TV-AVR request indication, that the requested content is, or is not, video content. This indication can take the form of a data element, e.g., a string that reads 'VIDEO' or 'AUDIO', or any other data type suitable to identify the nature of the requested content. As used herein, the term TV-AVR request refers to not only utterances that include a user request to play video on the TV screen but also utterances that include a user request to play high-quality audio content (such as music) on the high-quality speakers of the TV-AVR system. In some embodiments, an utterance can lead to a directive that includes a TV-AVR request if, by the language of the utterance 1) it requires video output because the content requested is necessarily video content; 2) it implies a desire for high-quality audio content; 3) implies a native VCMD interaction; or 4) the language of the utterance implies that the desired output is video.

As an example of case 1) above, an utterance can be determined to require video output in a situation where, according to the meaning of the language in the utterance, no other possible output modality is possible. For example, an utterance such as "Alexa, watch Man in the High Castle" or "Alexa, play Man in the High Castle" includes an unambiguous reference to video content, the television show Man in the High Castle. Likewise, an utterance such as or "Alexa, play cat videos on YouTube" requires video content, cat videos, and a content source, YouTube, that provides only video content.

As an example of case 2) above, a TV-AVR requests can be identified based on a user's desire to hear music from high quality speakers, e.g., "Alexa, play 90s rock music." In this case, the VCMD may interpret this request as a TV-AVR request because the desired content is music. In some embodiments, the VCMD can default to playing music-specific TV-AVR request through the TV-AVR speakers because these speakers can provide a superior audio quality to the internal speakers of the VCMD. In comparison, an utterance such as "Alexa, play my to-do list" will not be interpreted as a TV-AVR request because there is no need to play the requested audio on high-quality speakers of the TV-AVR system. In addition, a user may not want to wait for the TV-AVR system to be turned on and the VCMD brought into focus before she hears the to-do list audio. Accordingly, in this type of scenario, the VCMD can be configured to initiate playback of the requested audio as quickly as possible using the internal speaker of the VCMD.

In view of the above, for music-specific TV-AVR requests, the VCMD can include one or more user preference settings that indicates a default output source. For example, if the user always wants music to be played on the highest quality output device available, then the user preference setting can indicate that the VCMD should route music-specific TV-AVR requests to the TV-AVR speakers. However, if a user prefers playback speed and reliability over audio quality, the user may set the preference setting to always play music-specific TV-AVR request through the internal speakers of the VCMD. This category of functionality is described in further detail below in reference to FIG. 11.

As an example of case 3) above, an utterance can be determined to include a TV-AVR request if the utterance implies some form of native VCMD interaction, e.g., such as, "Go to my watch list" or "Rent Passengers." In these cases, the system may need to access content that is inherently associated with some form of audio-video platform or subscription service, or may imply some form of user input/interaction that requires a user to interact with content that is displayed on the screen, e.g., via a user input device such as a remote, before it can be completed.

As an example of case 4) above, a TV-AVR request can be identified because the language of the utterance implies that the desired output is video content. Is such as case, certain words in the utterance can be recognized as associated with a user's intent to obtain video or visual content. For example, after the wakeword, the utterance may use the word "show" as in "Alexa, show me my commute" or "Alexa, show me my calendar."

VCMD 300 also includes a device controller 325. Device controller 325 includes a state monitor 319 that can monitor various TV-AVR system devices, determine their current states, and then store the state in memory or transmit the state information periodically and/or asynchronously to the DMC 324. In addition, the device controller 325 includes a device control service that can generate device control signals that can be sent to the TV-AVR system via various device interconnects of VCMD 300, e.g., the IR LEDS 311 and/or the monitor/control block 301*a* of HDMI port 301. In general, the device controller 325 can generate IR control signals in a manner that is similar to a universal remote and also can generate HDMI control signals in the form of CEC commands and the like. As would be appreciated by one of ordinary skill in the art, many different types of control signals and channels in addition to IR and CEC controls are possible without departing from the scope of the present disclosure.

VCMD 300 also includes a speaker controller 327 and a video controller 302 that can receive audio and video data and/or commands from both the SIM 320 and the DMC 324. Speaker controller 327 can include interface hardware and software that receives data associated with the audio content and provides an audio signal to the internal speaker 309 of the VCMD 300 and/or to the audio subblock 301*c* of the HDMI port 301.

According to certain embodiments, speaker controller 327 can source audio data from either the VRS 321 or from an external audio content source 308 such as a cloud-based streaming music service. For example, in the case of a user utterance such as, "Alexa, what's the weather report today?" audio response data can be generated by VRS 321 and sent to VCMD 300 as one or more audio directives. In this specific example, SIM 320 will execute a set of directives which will cause dual mode controller 324 to direct the speaker controller 327 to route this relatively low quality audio (the weather report) to the internal speaker 309 of the VCMD. Other pieces of audio data may also be sent with the response data such as a TTS response that is generated by VRS 321 in response to the utterance.

In other examples, such as an utterance like, "Alexa play music," VRS 321 can include a music playback directive that is passed to SIM 320. SIM 320 can then send one or more messages to media players module 304 to cause an audio player to launch and connect to a remote content source 308 such as a streaming music service. The music stream is then provided by the audio player to speaker controller 327. In this case, because the audio data represents music, the speaker controller 327 will route the audio signal to the external speakers that are operatively connected to the TV-AVR system 303. For example, speaker controller 327 can send a properly encoded audio signal via the audio sub-block 301*b* of HDMI 301.

While not shown above, the video controller 302 can source video content from either the VRS 321 or the content source 308 and, in addition, the SIM 320 can provide content directly to one or more video data lines of HDMI port 301, e.g., via video sub-block 301*c*. For example, in the case of an utterance such as "Alexa, show me the weather," the response data from the VRS 321 can include a visual directive that corresponds to video data associated that includes one or more cards to be displayed on the TV screen. Thus, in this case SIM 320 may communicate directly with HDMI port 301. In other examples, such as for an utterance like, "Alexa, play The Crown on Netflix," the response data from the VRS 321 can include a video playback directive. In this case the video playback directive will cause SIM 320 to instruct the media players module 304 to launch the Netflix media player and to connect to the remote Netflix content source to begin streaming the video content. In the case of video FIGS. 4-7 show sequence diagrams that further illustrate the method of operation of a VCMD according to certain embodiments, e.g., VCMD 300 shown and described above in reference to FIG. 3. More specifically, the sequence diagrams illustrate the interaction between various subsystems of the VCMD. Each of the different sequence diagrams illustrate an example of how the subsystems interact, depending on the nature of the user utterance and on the state of the TV-AVR system at the time the utterance is received. In the examples shown in FIG. 4, the TV-AVR system is assumed to be a TV. These sequence diagrams are provided here merely for the sake of example and one of ordinary skill will appreciate that many different sequences are possible, depending on the user utterance, topology, and current state of the TV-AVR system.

Figure 4:
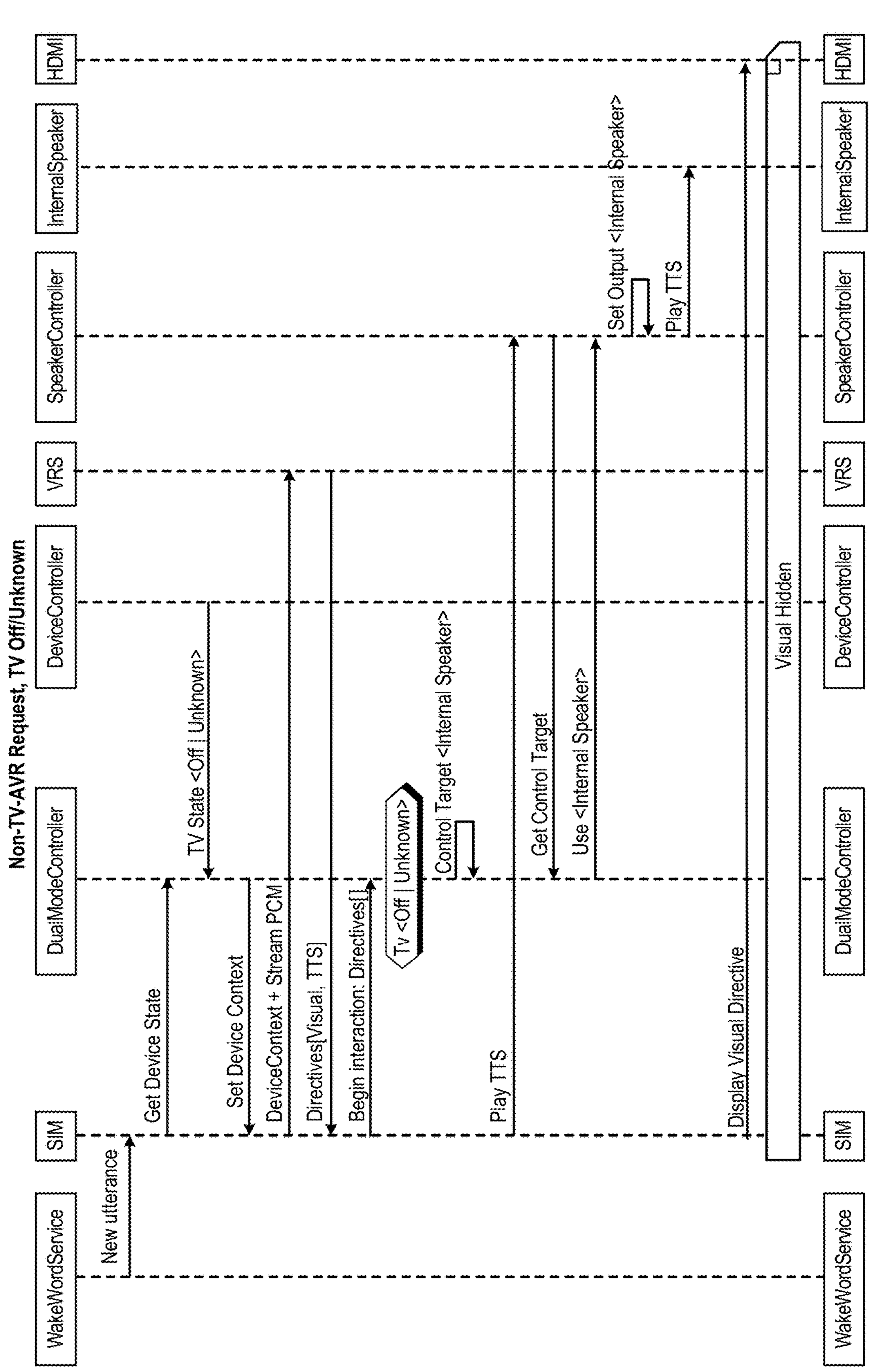
FIG. 4 shows a sequence diagram to further illustrate the method of operation of a voice-controlled multimedia device in accordance with one or more embodiments of the disclosure.

FIG. 4 shows an example sequence diagram for the case of an utterance that includes a non-TV-AVR request and an initial TV-AVR system state that is in either the OFF or Unknown state. Examples of a non-TV-AVR request include utterances such as, "Alexa, what's the weather report?" For this type of non-TV-AVR requests, it is assumed that the user's intent is to not have the VCMD turn on the TV-AVR system if it is off initially. Instead, the VCMD will route the requested audio to the internal speakers of the VCMD. It should be noted that in some cases, a non-TV-AVR request can come paired with default video content, e.g., a display of one or more cards that show various weather related data. However, because of the non-TV-AVR nature of the request, the TV-AVR system will only display such video if the TV-AVR system is already on. Stated another way, the response to a non-TV-AVR request need not be pure audio. However, if the response does include audio and video, some embodiments of the VCMD can be configured to only display the video if the TV-AVR system is already on. Sending video content in this way (regardless of the state of the TV-AVR system) can help mitigate any unpleasant user experience issues if the TV-AVR state is misreported.

Returning now to the sequence diagram of FIG. 4, at the outset, a wakeword service, which can be a detection service that is running on input audio processing system 315 shown in FIG. 3, detects the presence of a wakeword in the ambient audio detected by the microphone. In response to the detection of the wakeword, the wakeword service notifies the SIM that a new utterance is in the process of being detected. In response to this notification, the SIM sends an audio-video power state status request to the DMC to obtain the current TV-AVR system state, shown here as a 'Get Device State' message. In some embodiments, the DMC is configured to store a current description of the device state. The device state can be updated periodically in response to state information provided by the Device Controller. According to certain embodiments, the Device Controller can accomplish this by periodically providing the DMC with the device state via a recurring message. Alternatively, the device state can be provided asynchronously by the device controller in response to a request from the DMC.

Returning to the particular example shown in FIG. 4, the device controller provides a device state of TV<Off|Unknown> to the DMC because the device controller determined that the TV is either in a power OFF state or in an Unknown state.

Upon receiving the current device state information from the device controller, the DMC then sends a Set_Device_Context message to the SIM to instruct the SIM to create a Device_Context that indicates that the TV is either in the OFF or Unknown state. Next, the SIM provides both the Device_Context and the PCM audio stream including the utterance data to the VRS. As mentioned above, the VRS can take the Device_Context and PCM information and generate a set of Directives, e.g., Directives[$D_1$, $D_2$, . . . , $D_n$]. According to certain embodiments, the Directives can take the form of a list of commands and one or more pieces of audio and/or video data. In this example, the directives include a command to play video consisting of one or more cards showing the weather report and also includes an instruction to play a TTS response on the internal speaker of the VCMD. In some embodiments, the TTS response can be passed down in the directive as a piece of pre-rendered PCM audio that represents the VRS's response to the user's utterance.

In response to receiving the set of directives, the SIM passes the directives to the DMC and instructs the DMC to being its interaction according to the directives. In some embodiments, the DMC can be programmed with logic that can determine the output source based on information contained in the directives, or the VRS can include the output source in the directive itself.

In this case, because this is a non TV-AVR request and the TV-AVR state is TV <Off|Unknown>, the device control logic can instruct the DMC to set its control target to <Internal Speaker> indicating that any TTS or requested audio is to be played on the internal speaker of the VCMD.

Next, the SIM can transmit a Play_TTS message to the speaker controller telling the speaker controller to begin playing the TTS audio. For example, in the case of an utterance such as, "What's the weather?" the TTS audio could be "Here's your weather report for today . . . ." In response to the Play_TTS message, the speaker controller can send a Get_Control_Target message to the DMC to obtain the current value for the Control_Target variable, in effect asking the DMC what output system the TTS audio is to be played on. In response to the Get_Control_Target message, the DMC can send a Use<Current_ Control_Target> message to the speaker controller to inform the speaker controller of the currently selected output device. In this case, the internal speaker of the VCMD is the current control target, so the DMC instructs the speaker controller to use the internal speaker as the output device. The speaker controller then plays the TTS audio on the internal speaker of the VCMD As mentioned above, some non-TV-AVR requests can include accompanying video regardless of the state of the TV. FIG. 4 shows such an example, and therefore, after the speaker controller plays the TTS audio on the internal speaker, the SIM can cause video data to be sent to the HDMI port. In the particular case shown in FIG. 4, the TV is off and therefore the video content will be hidden from view. However, if the state of the TV happened to be reported incorrectly, the video data will be displayed thereby improving the overall user experience for cases when the TV-AVR state might be erroneous. As would be appreciated by one of ordinary skill in the art with the benefit of this disclosure, there can be alternative configurations where no visual directive is sent in response to a non-TV-AVR request without departing from the scope of the present disclosure.

Figure 5:
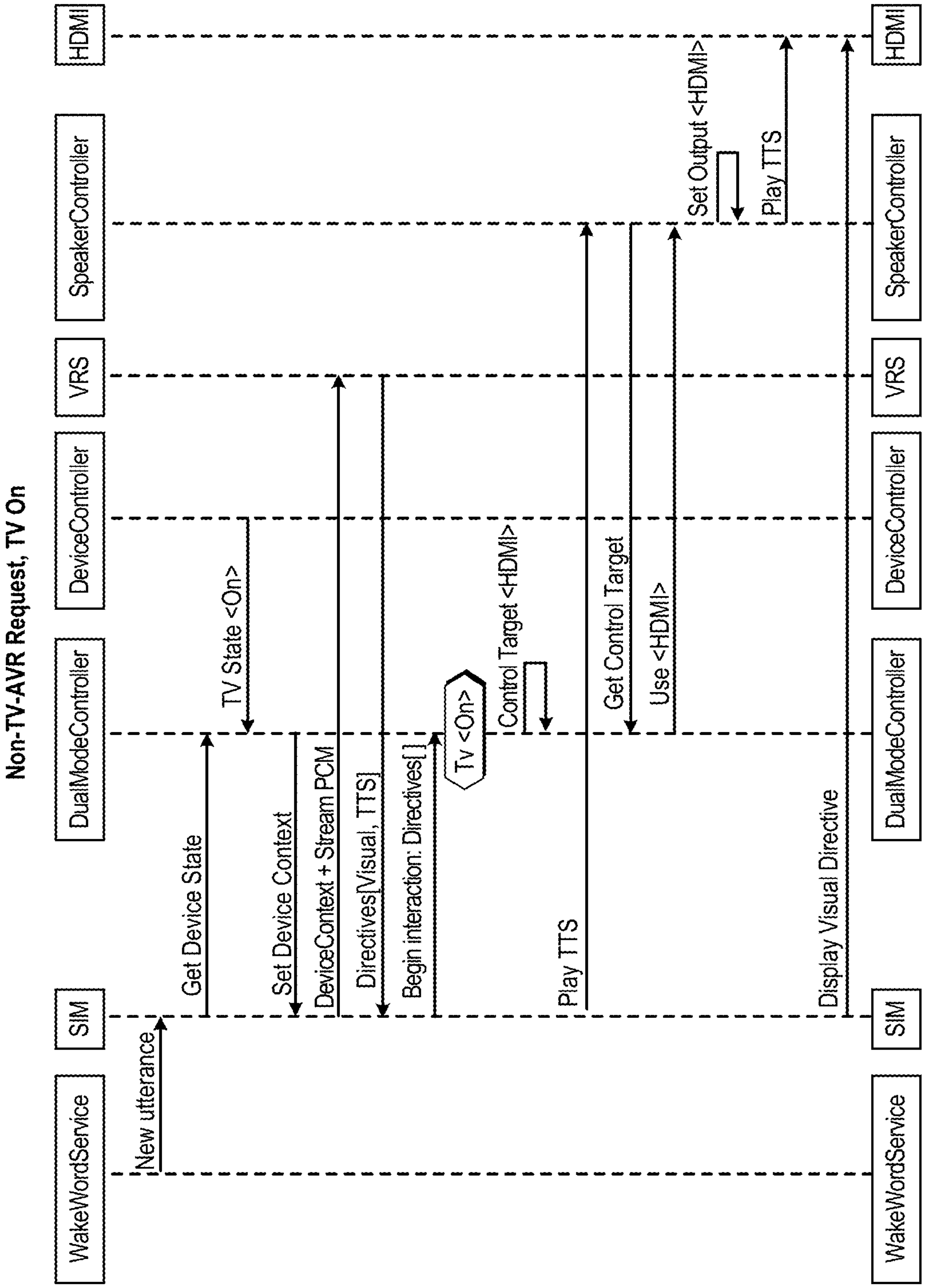
FIG. 5 shows a sequence diagram to further illustrate the method of operation of a voice-controlled multimedia device in accordance with one or more embodiments of the disclosure.

FIG. 5 shows an example sequence diagram in the case of an utterance that includes a non-TV-AVR request and an initial TV-AVR system state that is ON. The sequence largely proceeds as described above in reference to FIG. 4. However, because the TV is already in the ON state, the DMC sets that Control Target to <HDMI> instead of <Internal Speaker>. As a result, the Speaker Controller routes the TTS audio to the HDMI port of the VCMD resulting in the TTS being played on the TV speaker. In addition, because the TV is already in the ON state, the video data associated with the utterance, if any, can be displayed on the TV. In some embodiments, the directive itself can include video data and in other embodiments, the directive can include a url with an instruction to obtain the content from an external source.

Figure 6:
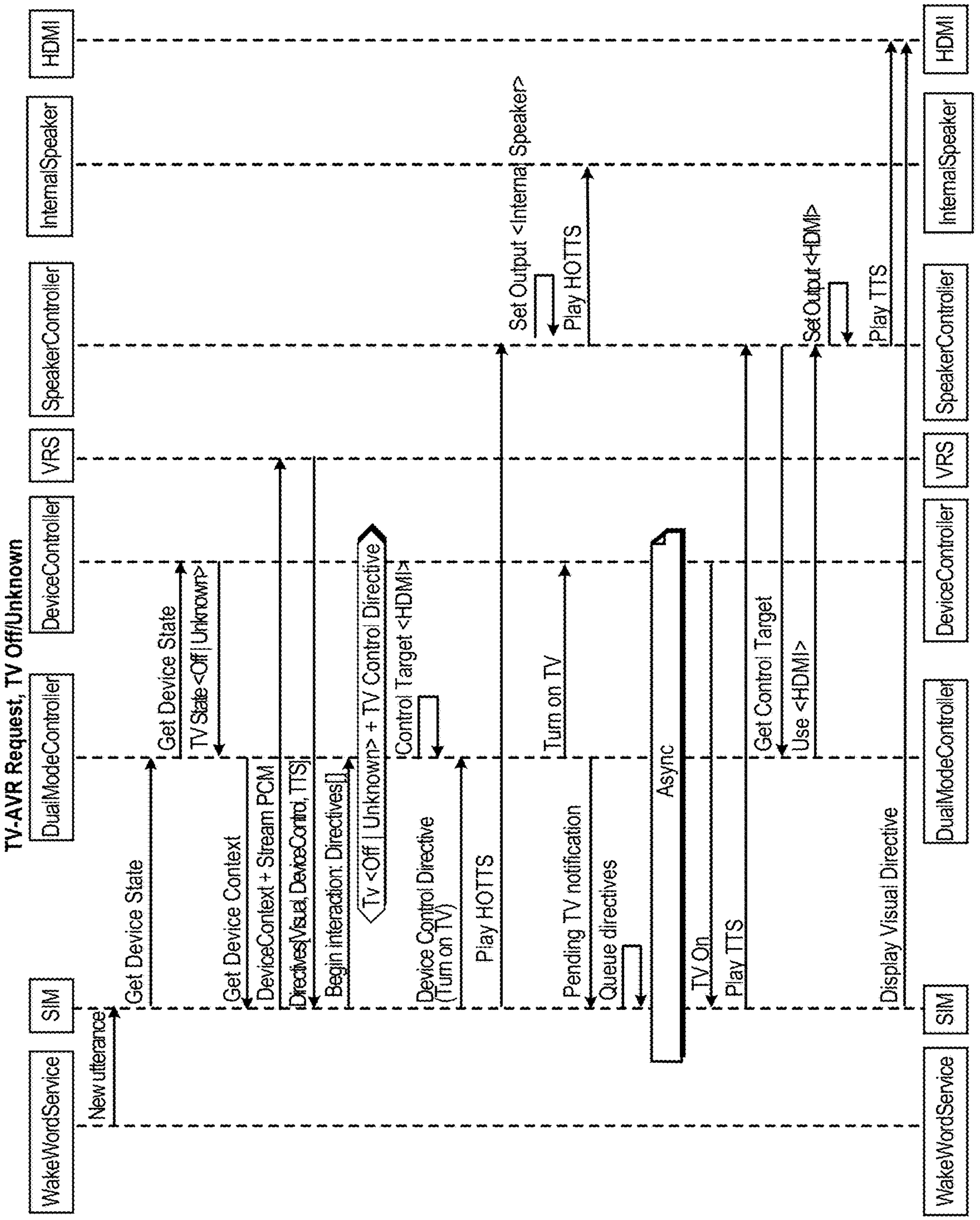
FIG. 6 shows a sequence diagram to further illustrate the method of operation of a voice-controlled multimedia device in accordance with one or more embodiments of the disclosure.

FIG. 6 shows an example sequence diagram in the case of an utterance that includes a TV-AVR request, i.e., the user's intent is to view video content, and an initial TV-AVR system state that is OFF or Unknown (e.g., the TV is initially in an OFF power state). The sequence initially proceeds as in FIGS. 4-5, but in this case, because the TV in initially OFF, the VRS will instruct the VCMD to turn the TV ON in order to play the requested video content. Accordingly, the response from the VRS includes an additional Device_Control directive that includes instructions to the VCMD to turn the TV ON. As before, the directives are response data that are generated by the VRS in based on speech input data that represents the user utterance. Once the directives are passed from the VRS to the SIM, the interaction of the VCMD with one or more components of the TV-AVR system can begin.

Because the directives indicate that this is a TV-AVR request, the DMC sets the ControlTarget to HDMI in preparation to provide video to the HDMI input of the TV. Next, the SIM sends the DeviceControl directive to the DMC with an instruction to turn the TV ON. In order for the user to be made aware that the TV is in the process of being turned on, the SIM will then trigger the playing of a handover text to speech (HOTTS) response message on the internal speaker of the VCMD. For example, in response to an utterance such as, "Alexa, play Interstellar," the VCMD can generate a TTS response that states, "OK, playing that on your television." Such a handover audio message can improve the user experience because for some TV-AVR systems, it may take several seconds or even tens of seconds for the VCMD to put the TV-AVR system in the appropriate playback state and if not notified the user may wonder what is occurring during this time and whether or not the system is responding. In some embodiments, the HOTTS message is generated by and stored on the VCMD and is triggered based on the initial state of the TV-AVR system. For example if the directives indicate that the utterance includes a TV-AVR request and the TV-AVR system is in the OFF state, the SIM of the VCMD will cause the HOTTS message to be played on the internal speaker of the VCMD. In other examples, the HOTTS can be passed down from the VRS in the form of a directive.

Returning to FIG. 6, to begin turning on the TV, the DMC first sends a power state command and/or an AV input state command, shown here as a Turn_On_TV command, to the Device Controller. At this stage, the device controller can send a number of different commands, depending on the topology and initial state of the TV-AVR system. For example, the device controller can send IR and/or HDMI CEC commands to one or more components of the TV-AVR system to make sure that the VCMD is in focus, if not already. After sending the Turn_On_TV command, the DMC can send a PendingTVNotification message back to the SIM to inform the SIM that the turn on process has commenced.

The SIM can then queue the remaining directives and wait for the Device Controller to take the necessary actions to turn on the TV-AVR system and to bring the VCMD system into focus. Once the turn on process is complete, the Device Controller will send a response to the SIM indicating that the TV is now in the ON state. Once the response is received, the sequence proceeds as already described in FIGS. 4-5.

Figure 7:
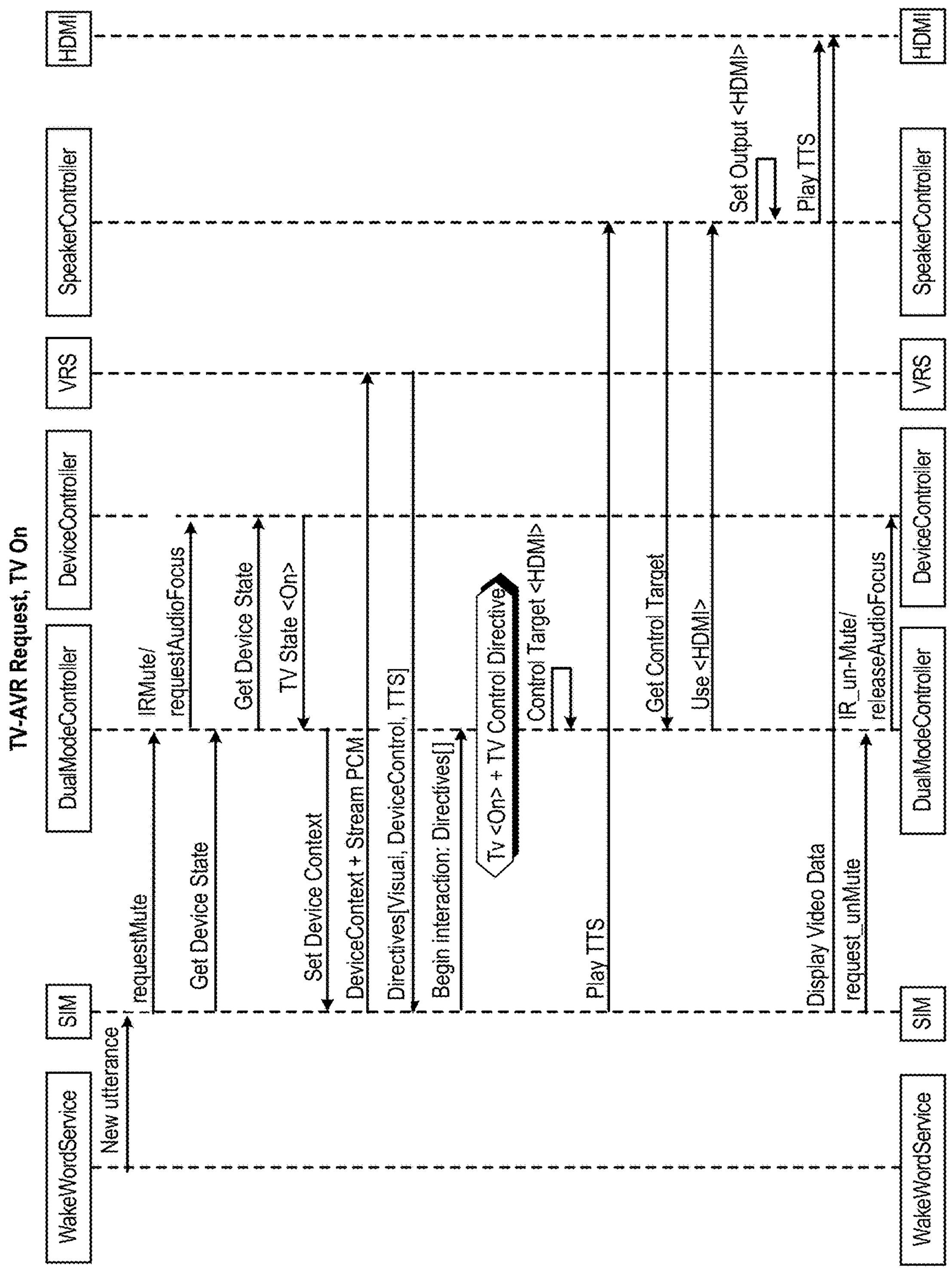
FIG. 7 shows a sequence diagram to further illustrate the method of operation of a voice-controlled multimedia device in accordance with one or more embodiments of the disclosure.

FIG. 7 shows another example of an utterance that includes a TV-AVR request and an initial TV-AVR system state that is in the ON state. The sequence generally proceeds as in FIG. 6, except in this case, up detecting the wakeword, the SIM will instruct the Device Controller to Mute the TV audio. In order to mute the TV audio, the dual mode controller will consult the current active input state of the TV-AVR system and will either send a mute command, e.g., via IR, to mute the TV or will send a request to the VCMD to gain audio focus. More specifically, if the current active input of the TV-AVR system is not the VCMD, this indicates that the user is watching TV content from some other input device. In this case, the Dual Mode Controller will instruct the Device_Controller to send a mute command to the TV either via IR or via an HDMI CEC command, if supported. Then the process will proceed largely as discussed in FIG. 6. Once the directives have all been processed and the new video data is ready to be played, the SIM will send a request_unMute command to the Dual Mode Controller and the Dual Mode Controller will send the appropriate message to the TV/media player (via IR or HDMI) to unmute and/or release audio focus.

In the other case, where at the time the utterance is received, the current active input of the TV-AVR system is the VCMD, this indicates that the user is streaming TV content from the VCMD. In this case, the IR/HDMI mute command is not used, but rather, a requestAudioFocus command is used. In general, a requestAudioFocus command will notify the appropriate applications to mute/duck their audio. For example, if the user is currently streaming a movie from Amazon Prime Video, the requestAudioFocus command from the Dual Mode Controller can cause the Device Controller to pause playback on the media player. Like before, once the media player is paused, the SIM will execute the remaining directives and then finally send a request_unMute command to the Dual Mode Controller. The Dual Mode Controller will then send a releaseAudioFocus command to the Device Controller ultimately causing the Device Controller to take the necessary steps to play the requested content.

FIGS. 8-11 are a flowcharts that conceptually illustrate the operation of a VCMD according to examples of the present disclosure with a focus on the logic that would be applied by one or more controllers of the VCMD to effectuate the intent of the user. According to some examples, the VCMD can operate as a "dual-mode" device and can be programmed with dual mode logic. As used herein the term "dual mode device" refers to a VCMD that can play audio one at least two distinct output systems: the internal speaker of the VCMD and an audio system of a TV-AVR system, e.g., a TV speaker and/or the one or more external speakers of the TV-AVR system. As described above, the dual mode logic of the VCMD can determine which output system to play the requested audio based, at least in part, on two inputs: 1) a user intent as determined from a user utterance received at a microphone of the VCMD; and 2) the state (both power and/or AV input) of TV-AVR system, e.g., a television and/or television that is connected to an audio-video receiver. According to certain embodiments, depending on the precise device configuration and limitations of the HDMI protocols and/or the microphone arrays being used, the device state may not be reliably determinable but rather be in a consistently "Unknown" state. In these types of scenarios, altered voice utterances can be used that indicate the current device state and/or one or more other signals may be monitored to imply a device state. In some situations, the VCMD logic can be modified to handle an unknown state directly, e.g., as described above in reference to FIG. 4.

Figure 8:
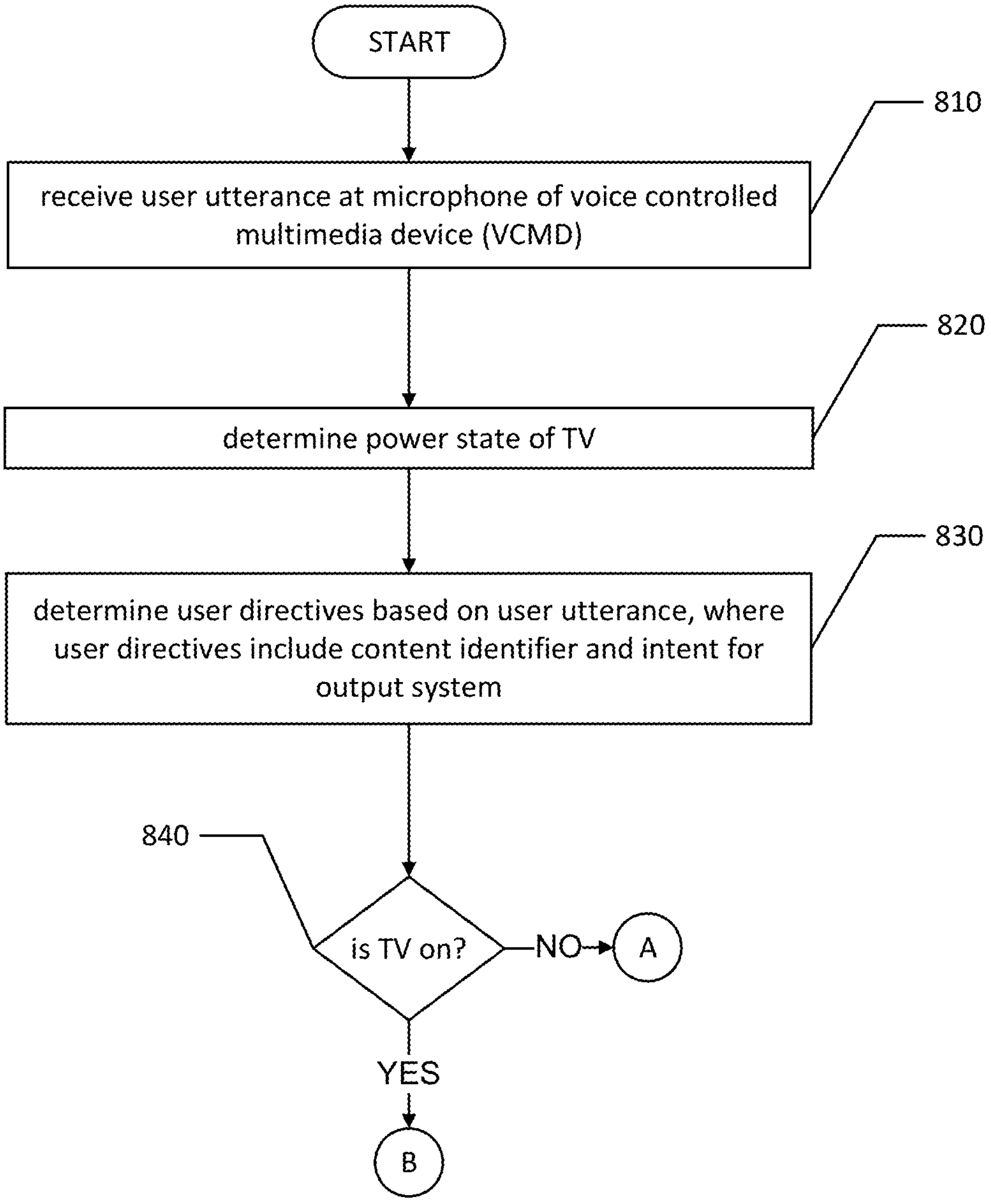
FIG. 8 is a flowchart that conceptually illustrate the operation of a voice-controlled multimedia device in accordance with one or more embodiments of the disclosure.

Starting with FIG. 8, in step 810, a user utterance is received at a microphone of the VCMD. An utterance usually begins with a wakeword, e.g., "Alexa" that upon detection by the VCMD, indicates to the VCMD that a user voice command will be forthcoming. For example, user utterances can be statements that communicate a user's intent to hear audio content, such as "Alexa, play some jazz music" or "Alexa, play my flash briefing." In other examples, user utterances can be statements that communication a user's intent to view video content, such as "Alexa, show me my shopping list" or "Alexa, show me my flash briefing."

In step 820, the VCMD determines the power state of the TV-AVR system that is operatively connected to the VCMD. For example, a television may be connected via the HDMI port of the VCMD. In some examples, an audio-video receiver and television may both be connected, as well as one or more external speakers. In order to generate the proper device control commands to effectuate the intent of the user's utterance on the TV-AVR system, the VCMD needs to be aware of the power state of the TV-AVR system. In some embodiments, the state of the TV-AVR system can be determined via signals that can be read from one or more pins of an AV interconnect, such as an HDMI port. In other examples, the state of the TV-AVR system can be determined by sending a sub-audible audio signal to the TV-AVR system via the AV interconnect, and then listening for the sub-audible signal on one or more microphones of the VCMD. In either case, one or more embodiments may initiate an audio-video power state status request message to initiate the state detection process.

In step 830, the VCMD determines, from the utterance audio data, a set of directives that represent the user's intent. In some embodiments, the utterance audio data is passed to a voice recognition service where voice recognition process can be performed on the utterance audio data in order to extract the intent of the user and build a set of directives. As described above in reference to FIGS. 3-7, the directives can be a series of commands and can also include audio and/or video directives that include digital audio and/or video data. The directives can indicate both the content that should be played, e.g., "jazz music," and the intended output system to be used for the request, e.g., whether or not the user's intent reflects a TV-AVR request or a non-TV-AVR request. In some embodiments, as also described above in reference to FIG. 3, the voice recognition process can be performed remotely from the VCMD at an external voice recognition system including one or more voice recognition servers. In other embodiments, all or part of the voice recognition process can be performed locally on the VCMD.

In step 840, a decision is made by the VCMD based on the state of the TV-AVR system. If the TV-AVR system is in the OFF state, the method proceeds as described in further detail below in reference to FIG. 4. If the TV-AVR system is in the ON state, the method proceeds as described in further detail below in reference to FIGS. 5-6.

Dual Mode Behavior for TV AVR System Initially in Power OFF State

Figure 9:
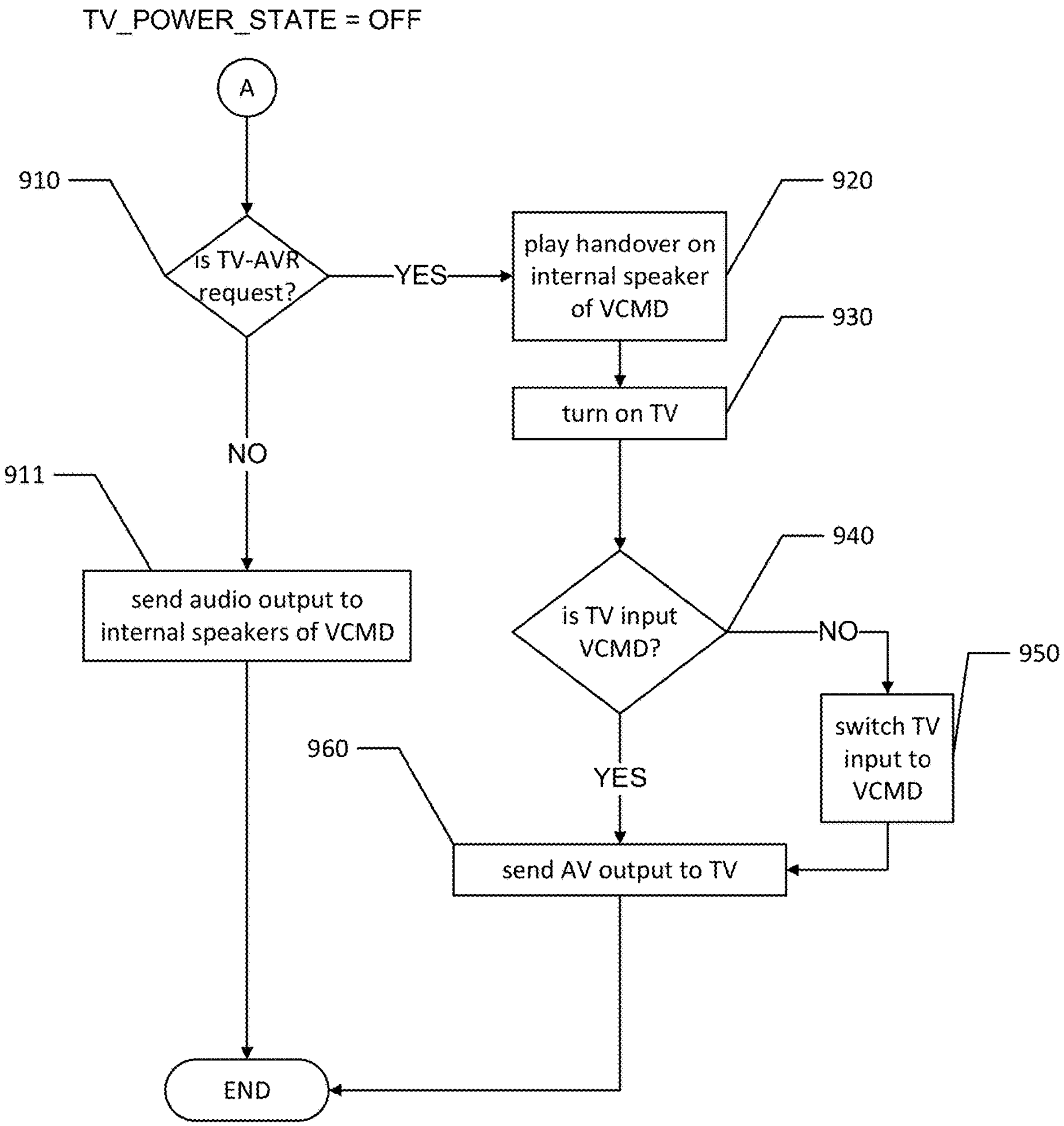
FIG. 9 is a flowchart that conceptually illustrate the operation of a voice-controlled multimedia device in accordance with one or more embodiments of the disclosure.

If the VCMD detects that the TV-AVR system is in the OFF state, the method of operating the VCMD can next proceed as shown in FIG. 9. In step 910, the VCMD determines whether or not the directives include a TV-AVR request.

If the VCMD determines that the directives include a TV-AVR request, then in step 920 a handover audio message is played on the internal speaker of the VCMD. As used herein a handover audio message is an audio message that is played by the VCMD to indicate to the user that the VCMD is going to play the requested content on the TV-AVR system. For example, the VCMD can quickly state, "OK, playing that on your television" in response to a user utterance of "Alexa, play Interstellar." Such a handover audio message can improve the user experience because for some TV-AVR systems, it may take several seconds or even tens of seconds for the VCMD to put the TV-AVR system in the appropriate playback state. For example, in some instances, the VCMD may first have to switch ON the TV, then switch ON the AVR, and finally switch the active inputs of both the TV and the AVR to the VCMD before any TTS response indication can be played on the speakers of the TV-AVR system. In such a case, rather than keeping a user sitting in silence as this process completes (or fails to complete), the handover audio message from the VCMD notifies the user that the utterance has been received and that the VCMD has initiated the process of playing content on the TV-AVR system. Furthermore, the use of the handover audio message improves the user's ability to recognize that there may be a problem with the TV-AVR system if no action is taken by the TV-AVR system a long time, e.g., more than a minute, after the handover audio message has been played.

In step 930, the VCMD then sends a control signal to the TV-AVR system in order to turn on the component(s) of the system. For example, the VCMD can be connected via an HDMI port to a TV of the TV-AVR system and can send a "power on" command via HDMI-CEC to turn on the TV. In other situations the VCMD can use its IR transmitters to send one or more control signals via IR, similar to a universal remote. In some embodiments, the control signal may be formulated to turn on only the television or may turn on other components of the TV-AVR system as well. For example, in the case of a TV-AVR system that includes both an audio-video receiver and a TV, the control request may include a combination of control signals to, e.g., first turn on the receiver and then turn on the TV. As would be appreciated by one of ordinary skill in the art with the benefit of this disclosure, several different forms of control signals are possible depending on the topology of the TV-AVR system.

In step 940, the VCMD tests whether or not the AV input of the TV-AVR system is set to the proper input port, i.e., that the active AV input of the TV-AVR system is switched to the AV port that is currently connected to the VCMD. Such a test can be accomplished by, e.g., the VCMD sending an audio-video input state status request with the GetDeviceState message as described above in reference to FIGS. 4-7. For example, if the VCMD is connected to the HDMI_1 port of the television, the VCMD first queries TV-AVR system to identify whether or not the currently active AV input port is HDMI_1.

In step 950, if the active AV port is not already set to HDMI_1, the VCMD sends a control signal to switch the AV input of the TV-AVR system to HDMI_1. In another example, the VCMD need not detect the active HDMI port but instead can immediately send a control signal to the TV-AVR system that switches the active AV port of the TV-AVR system to the appropriate port, e.g., by employing a technology such as CEC One Touch Play.

In step 960, the VCMD then sends the requested audio-video content to the TV-AVR system, thereby completing the user's request.

Returning to step 940, if the AV port of the TV-AVR system is already set to the port that is connected to the VCMD, e.g., HDMI_1 in this example, then the process does not need to switch the AV inputs and instead proceeds to step 460 and completes.

Returning to step 910, if the VCMD determines that the directives include a request to play audio content only, then, in step 911, the VCMD can play the requested audio content on the internal speakers of the VCMD. In some embodiments, the VCMD may include a user preference setting that can over-ride the default behavior in step 911 and instead treat the audio request like a TV-AVR request, in which case the VCMD can proceed through steps 920-960 as described above. In such a case, it also may be possible for the user to set the user preference setting to treat only certain audio requests as TV-AVR requests, e.g., an utterance such as, "Alexa, play 90s rock music" can be interpreted by the VCMD as a music request to be played on the high-quality speakers of the TV-AVR system but an utterance such as, "Alexa, play my To-Do list" can still be played on the internal speaker of the VCMD. An embodiment having the user preference functionality is described in further detail below in reference to FIG. 11.

Figure 10:
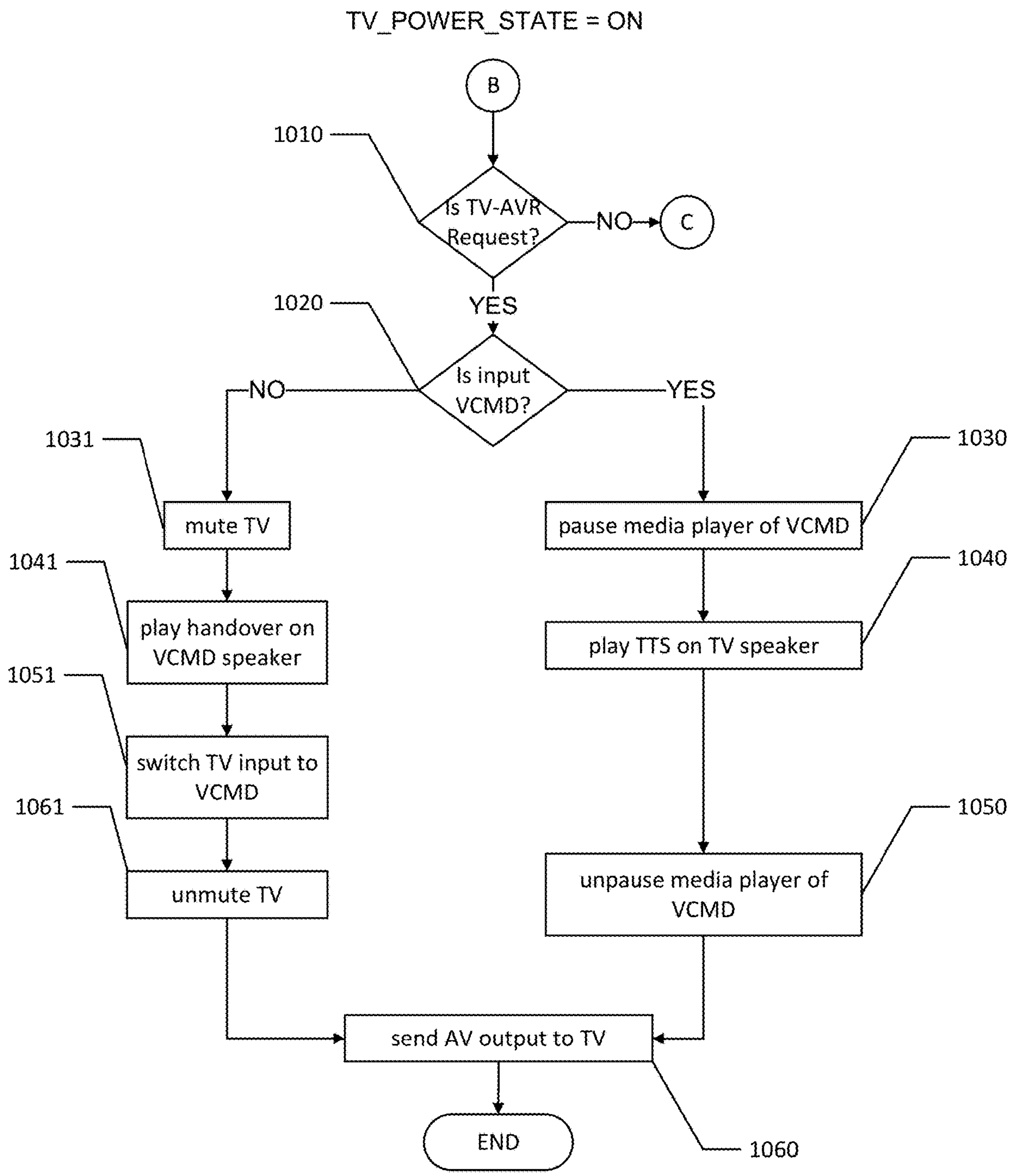
FIG. 10 is a flowchart that conceptually illustrate the operation of a voice-controlled multimedia device in accordance with one or more embodiments of the disclosure.
Figure 11:
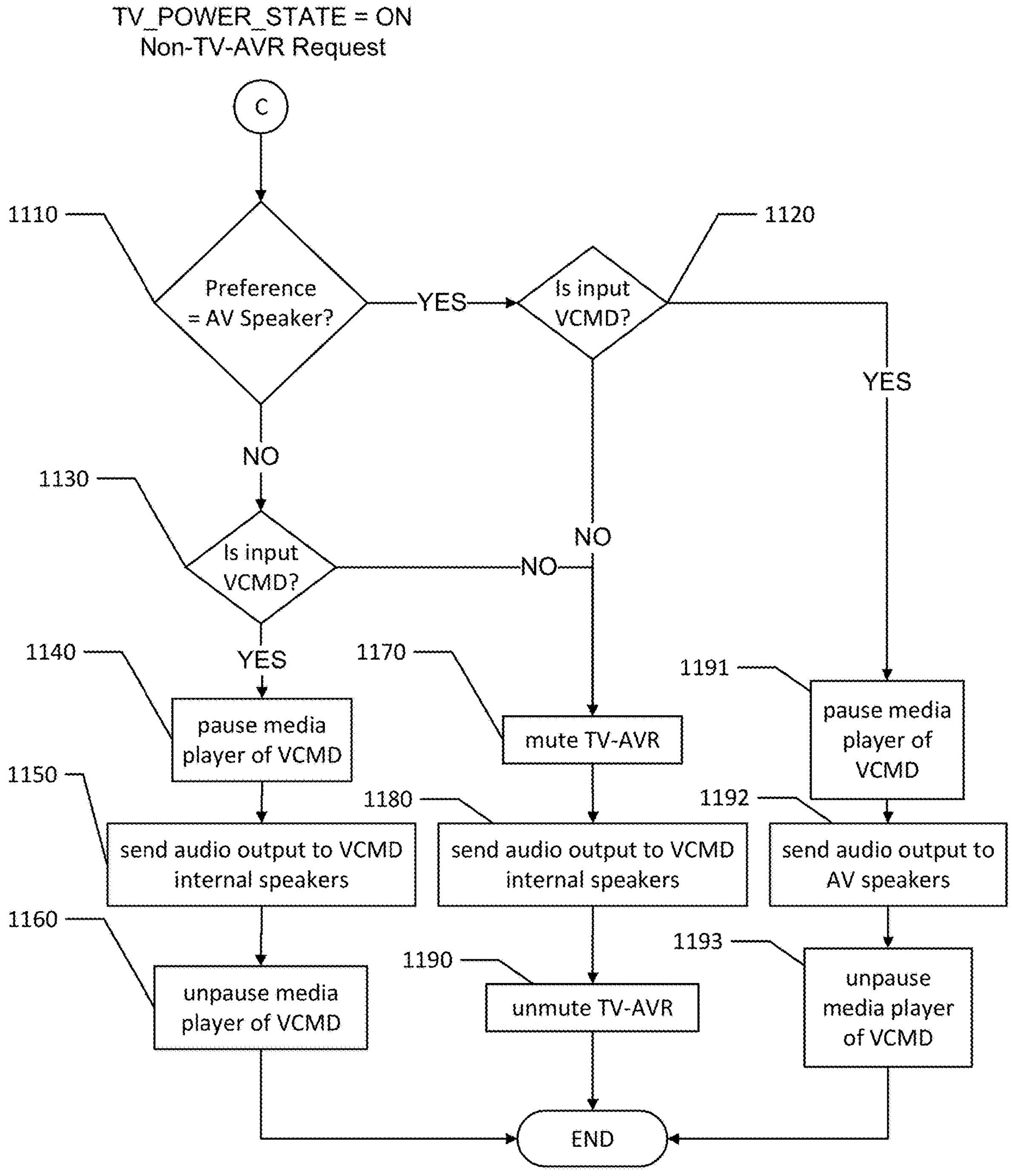
FIG. 11 is a flowchart that conceptually illustrate the operation of a voice-controlled multimedia device in accordance with one or more embodiments of the disclosure.

Dual Mode Behavior for TV-AVR System Initially in Power ON State, TV-AVR Request If the VCMD detects that the TV-AVR system is initially in the ON state, it can interact with the TV-AVR system as shown in FIG. 10. FIG. 10 shows a case where, in step 1010, the VCMD determines that the directives include a TV-AVR request. FIG. 11, shows a case where the VCMD determined that the directives include an non-TV-AVR request.

Returning to FIG. 10, the method steps shown here could be implemented in response to a user utterance such as "Alexa, play Interstellar" in a case where the TV-AVR system is already in an ON state at the time that the VCMD receives the directives. In step 1020, the VCMD tests whether or not the AV input of the TV-AVR system is set to the proper input port, i.e., that the active AV input of the TV-AVR system is switched to AV port that is currently connected to the VCMD. For example, if the VCMD is connected to the "HDMI_1" port of the television, the VCMD first queries TV-AVR system to identify the currently active AV input. If yes, then in step 2013, the VCMD can pause its media player in order to pause any content that is currently being sent to the TV-AVR system.

In step 1040, the VCMD then plays an TTS response on the currently active speaker of the TV-AVR system, e.g., on the TV's internal speaker. For example, in response to a receiving user utterance such as "Alexa, play Interstellar," the VCMD can play the intent message "OK, playing Interstellar" on the TV's internal speaker. In some embodiments, a visual indication can also be displayed on the display of the TV to indicate that the content is about to be played. In the meantime, the appropriate media player(s) of the VCMD can obtain the content from the source.

In step 1050, once a connection to the content provider is obtained, the VCMD can unpause the media player of the VCMD and then, in step 1060, send the new AV output, e.g., a stream of the movie Interstellar, to the to the TV-AVR system to cause the content to be played on the TV-AVR system.

If, on the other hand, it is determined in step 1020 that the active input port of the TV-AVR system is not currently set to the AV port that is currently connected to the VCMD, the VCMD can send a mute command to the television. In this case, because the input port is not already set to the input port of the VCMD it is assumed that the current content playing on the TV-AVR system, if any, is being sourced from somewhere other than the internal video player of the VCMD. In this case, the content may not be able to be paused by the VCMD, so instead, in step 1031, the VCMD can send a mute command to the TV-AVR system. The mute command can be sent via an infra-red communication channel, similar to a universal remote or can be sent via HDMI, such as a CEC command or the like. For example, the mute command can be sent from the one or more IR LEDs shown and described below in reference to FIG. 13. This can mute the speakers of the TV-AVR such that the TV audio will not interfere with any TTS/handover messages that are played by the VCMD in response to the user utterance.

In step, 1041 the VCMD can play a handover audio message on the internal speaker of the VCMD similar to that already as described above in reference to step 920 of FIG. 9.

In step 1051, the VCMD can switch the active AV port of the TV-AVR system to the VCMD, in a manner similar to that already described above in reference to step 950 of FIG. 9.

In step 1061 the VCMD can then unmute the TV-AVR system, e.g., by sending an unmute command to the TV-AVR system via the IR communication channel before initiating the new AV output stream in step 1060.

Dual Mode Behavior for TV-AVR System Initially in Power ON State, Non-TV-AVR Request FIG. 11, shows a case where the VCMD has determined that the TV-AVR system is ON and the directives include a non-TV-AVR request. In some embodiments, the VCMD can include a user preference that can affect how non-TV-AVR request are played on the system. For example, the default setting for the VCMD can be set to play all non-TV-AVR requests on the internal speaker of the VCMD. Alternatively, the user can set the preference to treat all or some categories of non-TV-AVR requests as TV-AVR requests that are consequently played on the TV-AVR system speakers. For example, a user can set a preference to treat music utterances, such as, "Alexa, play my playlist," as TV-AVR requests because it is the default preference of the user to hear her music on the highest quality speakers possible. Additionally, in some embodiments, the user preference can be even more granular such that even for music requests, the output system can be determined based on whether or not the VCMD is in focus or not. If it is not in focus, the user preference can indicate that the audio is to be played on the internal speakers of the VCMD rather than on the speakers of the TV-AVR. FIG. 11 shows one example of the logic employed by the VCMD in the case of this more granular user preference capability.

In step 1110, the current user preference is determined. In the case where the user preference indicates that all non-TV-AVR requests should be played on the internal speakers, the system can proceed to step 1130. Alternatively if the user preference indicates that all, or some, non-TV-AVR requests should be played on the TV-AVR system speakers, then the system can proceed to step 1120.

In step 1130, the VCMD tests whether or not the AV input of the TV-AVR system is set to the proper input port, i.e., that the active AV input of the TV-AVR system is switched to AV port that is currently connected to the VCMD. For example, if the VCMD is connected to the "HDMI_1" port of the television, the VCMD first queries TV-AVR system to identify the currently active AV input. If yes, in step 1140, the VCMD can pause its media player in order to pause any content that is currently being sent to the TV-AVR system.

In step 1150, the VCMD then plays the requested audio content on the internal speaker of the VCMD. The audio content can include not only content that was specifically referred to in the user utterance, but can also include the appropriate TTS response.

In step 1160, once the requested audio content is finished playing, the VCMD can unpause the media player of the VCMD and the content that was originally playing can resume.

If, on the other hand, it is determined in step 1130 that the active input port of the TV-AVR system is not currently set to the AV port that is currently connected to the VCMD, in step 1170, the VCMD can send a mute command to the television. In this case, because the input port is not already set to the input port of the VCMD it is assumed that the current content playing on the TV-AVR system, if any, is being sourced from somewhere other than the internal video player of the VCMD. In this case, the content may not be able to be paused by the VCMD, so instead, the VCMD can send a mute command to the TV-AVR system using an infra-red communication channel, similar to a universal remote. For example, the mute command can be sent from the one or more IR LEDs shown and described below in reference to FIG. 13. This can mute the speakers of the TV-AVR as described above in reference to FIG. 10.

In step 1180, the VCMD then plays the requested audio content on the internal speaker of the VCMD. The audio content can include not only content that was specifically referred to in the user utterance, but can also include an appropriate TTS response.

In step 1190 the VCMD can then unmute the TV-AVR system, e.g., by sending another unmute command via the IR communication channel.

Returning to step 1120, the VCMD tests whether or not the AV input of the TV-AVR system is set to the proper input port as in step 1130 described above. If yes, in step 1191, the VCMD can pause its media player in order to pause any content that is currently being sent to the TV-AVR system.

In step 1192, the VCMD then plays the requested audio content on the speakers of the TV-AVR system. The audio content can include not only content that was specifically referred to in the user utterance, but can also include an appropriate TTS response.

In step 1193, once the requested audio content is finished playing, the VCMD can unpause the media player of the VCMD and the content that was originally playing can resume.

FIG. 12 schematically depicts a VCMD 1200 in various views in accordance with one or more embodiments of the disclosure. As illustrated in perspective view 1210, the VCMD 1200 may have a box-like housing 1202. Specifically, the housing 1202 may have a number of sidewalls that form sides of the device, as well as walls forming top and bottom surfaces. The VCMD 1200 may include a set of infrared LEDs that are configured to emit infrared light through each of the sidewalls, and m some embodiments, through the top and bottom surfaces, of the housing 1202. Other embodiments may have different form factors. In some embodiments, the VCMD 1200 may be treated with a water resistant coating.

The VCMD 1200 may include one or more physical controls, such as buttons, switches, and other control devices. For example, the VCMD 1200 may include volume control buttons 1212 that control a speaker volume of the VCMD 1200 or of a connected device. The VCMD 1200 may include an action button 1214, a mute button or a privacy button 1216, and other buttons. In some embodiments, the VCMD 1200 may include a display or other component.

The VCMD 1200 may include one or more microphone holes 1218 that can be used to facilitate detection of ambient sound by one or more microphones positioned within the housing 1202.

The VCMD 1200 may include a light bar component 1220. The light bar component 1220 may be include an optically clear or colored elongated component 1222 through which light from one or more LEDs may be visible. The light bar component 1220 may be positioned at a front side 1230 of the VCMD 1200. In some embodiments, such as the illustrated embodiment, the light bar component 1220 may be linear or straight and may be positioned along an edge 1232 of the housing 1202. The elongated component 1222 may therefore be attached to, or integrated into, the housing 1202 and may form an edge of the housing 1202. The light bar component 1220 may be configured to indicate a location of sound detected by the VCMD 1200. For example, if a microphone of the VCMD 1200 detects sound or voice coming from a left side of the VCMD 1200, one or more LEDs on the left side of the VCMD 1200 may be caused to illuminate, so as to indicate to a user that sound is being detected from the left side of the VCMD 1200. The light bar component 1220 may dynamically modify LEDs that are illuminated while sound or voice is detected, and may also be used to visually communicate information to a user. For example, during processing, the light bar component 1220 may have a certain illumination status, while the device is muted, the light bar component 1220 may have a different illumination status, and so forth. The light bar component 1220 may be a straight or linear light bar component and may be visible to users. In some embodiments, the light bar component 1220 may be positioned elsewhere, along different edges or surfaces, and can be positioned diagonally or in another orientation respective to the housing of the device.

A rear side 1240 of the VCMD 1200 is illustrated in FIG. 12. The rear side 1240 of the VCMD 1200 may include one or more ports, inputs, outputs, and the like. For example, the rear side 1240 may include an Ethernet port, USB, or micro USB input 1242, a power input jack 1244, an HDMI port 1246 configured to output high definition video and audio, a 1248, an external infrared light blaster connection port 1248 (e.g., infrared light sensor input or output jack, etc.), and the like. In some embodiments, the VCMD 1200 may include a rechargeable battery.

A bottom surface 1250 of the VCMD 1200 may be formed by a bottom wall 1252 and may include components such as rubber feet, nonslip material, and other components to support the device. The bottom wall 1252 may include speaker holes 1254 to facilitate sound output from one or more speakers of the VCMD 1200.

FIG. 13 shows another view of the VCMD according to certain embodiments. An internal component assembly 1340, including the light bar component, may be positioned inside the housing 1300. A first infrared LED 1350 and a second infrared LED 1360 may be configured to emit infrared light through the walls of the housing 1300. Accordingly, light emitted by the side-firing LEDs may be visible through the clear elongated component 1310.

The microphone circuit board 1341 may include one or more microphones. For example, eight microphones may be positioned on a second surface of the microphone circuit board 1341. A first microphone 1370 may be angled in a first direction. A second microphone 1372 may be angled in a second direction. A third microphone 1374 may be angled in the first direction, and a fourth microphone 1376 may be angled in the second direction. A fifth microphone 1378, a sixth microphone 1380, a seventh microphone 1382, and an eighth microphone 1384 may be angled in a third direction. The set of microphones may be arranged in an array or in a different arrangement. The set of microphones may be used to detect sound and generate an audio signal, and also to detect a location of sound that is captured by any of the microphones.

Some or all of the process described above in reference to FIGS. 4-11 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 14 is a schematic block diagram of a VCMD in accordance with one or more example embodiments of the disclosure. The VCMD 1400 may include any suitable computing device including, but not limited to, a server system, a mobile device such as a smartphone, a tablet, an e-reader, a wearable device, or the like; a desktop computer; a laptop computer; a content streaming device; a set-top box; a scanning device; a barcode scanning wand; or the like. The VCMD 1400 may correspond to an illustrative device configuration for the VCMD device of FIGS. 1-3.

The VCMD 1400 may be configured to communicate with one or more servers, user devices, or the like. The VCMD 1400 may be configured to determine voice commands, determine wakeword utterances, determine and/or control other devices, and other operations. The VCMD 1400 may be configured to emit light, detect sound, output digital content, and other functionality. In some embodiments, a single remote server or a single group of remote servers may be configured to perform more than one type of functionality in conjunction with a barcode scanning device.

The VCMD 1400 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fibercoaxial (HFC) medium, a microwave medium, a radio frequency communication medium, a satellite communication medium, or any combination thereof.

In an illustrative configuration, the VCMD 1400 may include one or more, one or more memory devices 1404 (also referred to herein as memory 1404), one or more input/output (I/O) interface(s) 1406, one or more network interface(s) 1408, one or more sensor(s) or sensor interface(s) 1410, one or more transceiver(s) 1412, one or more optional camera(s) 1414, one or more optional microphone(s) 1416, and data storage 1420. The VCMD 1400 may further include one or more bus(es) 1418 that functionally couple various components of the VCMD 1400. The VCMD 1400 may further include one or more antenna(e) 1434 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1418 may include at least one of a system bus, a memory bus, an address bus, or a message bus, and may permit the exchange of information (e.g., data (including computer-executable code), signaling, etc.) between various components of the VCMD 1400. The bus(es) 1418 may include, without limitation, a memory bus or a memory controller, a peripheral bus, an accelerated graphics port, and so forth. The bus(es) 1418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1404 of the VCMD 1400 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1420 may include removable storage and/or non-removable storage including, but not limited to, magnetic storage, optical disk storage, and/or tape storage. The data storage 1420 may provide non-volatile storage of computer-executable instructions and other data. The memory 1404 and the data storage 1420, removable and/or non-removable, are examples of computer-readable storage media (CRSM) as that term is used herein.

The data storage 1420 may store computer-executable code, instructions, or the like that may be loadable into the memory 1404 and executable by the processor(s) 1402 to cause the processor(s) 1402 to perform or initiate various operations. The data storage 1420 may additionally store data that may be copied to the memory 1404 for use by the processor(s) 1402 during the execution of the computer-executable instructions. Moreover, output data generated as a result of execution of the computer-executable instructions by the processor(s) 1402 may be stored initially in the memory 1404, and may ultimately be copied to the data storage 1420 for non-volatile storage.

More specifically, the data storage 1420 may store one or more operating systems (O/S) 1422; one or more database management systems (DBMS) 1424; and one or more program module(s), applications, engines, computer-executable code, scripts, or the like such as, for example, one or more sound detection module(s) 1426, one or more communication module(s) 1428, one or more light bar control module(s) 1430, and/or one or more remote control module(s) 1432. Some or all of these module(s) may be sub-module(s). Any of the components depicted as being stored in the data storage 1420 may include any combination of software, firmware, and/or hardware. The software and/or firmware may include computer executable code, instructions, or the like that may be loaded into the memory 1404 for execution by one or more of the processor(s) 1402. Any of the components depicted as being stored in the data storage 1420 may support functionality described in reference to corresponding components named earlier in this disclosure.

The data storage 1420 may further store various types of data utilized by the components of the VCMD 1400. Any data stored in the data storage 1420 may be loaded into the memory 1404 for use by the processor(s) 1402 in executing computer-executable code. In addition, any data depicted as being stored in the data storage 1420 may potentially be stored in one or more datastore(s) and may be accessed via the DBMS 1424 and loaded in the memory 1404 for use by the processor(s) 1402 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 14, an example datastore(s) may include, for example, historical data for previously identified products, purchase or order history, user profile information, and/or other information.

The processor(s) 1402 may be configured to access the memory 1404 and execute the computer-executable instructions loaded therein. For example, the processor(s) 1402 may be configured to execute the computer-executable instructions of the various program module(s), applications, engines, or the like of the VCMD 1400 to cause or facilitate various operations to be performed in accordance with one or more embodiments of the disclosure. The processor(s) 1402 may include any suitable processing unit capable of accepting data as input, processing the input data in accordance with stored computer-executable instructions, and generating output data. The processor(s) 1402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1402 may be capable of supporting any of a variety of instruction sets.

Referring now to functionality supported by the various program module(s) depicted in FIG. 14, the sound detection module(s) 1426 may include computer-executable instructions, code, or the like that responsive to execution by one or more of the processor(s) 1402 may perform functions including, but not limited to, detect sound, determine sound meanings, generate audio signals and audio data, determine a location of sound, and the like.

The communication module(s) 1428 may include computer-executable instructions, code, or the like that responsive to execution by one or more of the processor(s) 1402 may perform functions including, but not limited to, sending and/or receiving data, including content, sending and/or receiving instructions and commands, and the like. The light bar control module(s) 1430 may include computer-executable instructions, code, or the like that responsive to execution by one or more of the processor(s) 1402 may perform functions including, but not limited to, determining a light bar illumination status, determining which LEDs to illuminate, causing a change in illumination status, and the like.

The remote control module(s) 1432 may include computer-executable instructions, code, or the like that responsive to execution by one or more of the processor(s) 1402 may perform functions including, but not limited to, controlling other electronic devices, sending infrared signals, sending or outputting digital audio or video signals, and the like.

Referring now to other illustrative components depicted as being stored in the data storage 1420, the O/S 1422 may be loaded from the data storage 1420 into the memory 1404 and may provide an interface between other application software executing on the VCMD 1400 and the hardware resources of the VCMD 1400. More specifically, the O/S 1422 may include a set of computer-executable instructions for managing the hardware resources of the VCMD 1400 and for providing common services to other application programs (e.g., managing memory allocation among various application programs). In certain example embodiments, the O/S 1422 may control execution of the other program module(s). The O/S 1422 may include any operating system now known or which may be developed in the future including, but not limited to, any server operating system, any mainframe operating system, or any other proprietary or non-proprietary operating system.

The DBMS 1424 may be loaded into the memory 1404 and may support functionality for accessing, retrieving, storing, and/or manipulating data stored in the memory 1404 and/or data stored in the data storage 1420. The DBMS 1424 may use any of a variety of database models (e.g., relational model, object model, etc.) and may support any of a variety of query languages. The DBMS 1424 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the VCMD 1400 is a mobile device, the DBMS 1424 may be any suitable lightweight DBMS optimized for performance on a mobile device.

Referring now to other illustrative components of the VCMD 1400, the input/output (I/O) interface(s) 1406 may facilitate the receipt of input information by the VCMD 1400 from one or more I/O devices as well as the output of information from the VCMD 1400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the VCMD 1400 or may be separate. The I/O devices may further include, for example, any number of peripheral devices such as data storage devices, printing devices, and so forth.

The I/O interface(s) 1406 may also include an interface for an external peripheral device connection such as universal serial bus (USB), FireWire, Thunderbolt, Ethernet port or other connection protocol that may connect to one or more networks. The I/O interface(s) 1406 may also include a connection to one or more of the antenna(e) 1434 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The VCMD 1400 may further include one or more network interface(s) 1408 via which the VCMD 1400 may communicate with any of a variety of other systems, platforms, networks, devices, and so forth. The network interface(s) 1408 may enable communication, for example, with one or more wireless routers, one or more host servers, one or more web servers, and the like via one or more networks.

The antenna(e) 1434 may include any suitable type of antenna depending, for example, on the communications protocols used to transmit or receive signals via the antenna (e) 1434. Non-limiting examples of suitable antennae may include directional antennae, non-directional antennae, dipole antennae, folded dipole antennae, patch antennae, multiple-input multiple-output (MIMO) antennae, or the like. The antenna(e) 1434 may be communicatively coupled to one or more transceiver(s) 1412 or radio components to which or from which signals may be transmitted or received.

As previously described, the antenna(e) 1434 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1434 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1434 may be configured to transmit or receive radio frequency signals within any suitable frequency range forming part of the unlicensed portion of the radio spectrum.

The antenna(e) 1434 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1412 may include any suitable radio component(s) for—in cooperation with the antenna(e) 1434—transmitting or receiving radio frequency (RF) signals in the bandwidth and/or channels corresponding to the communications protocols utilized by the VCMD 1400 to communicate with other devices. The transceiver(s) 1412 may include hardware, software, and/or firmware for modulating, transmitting, or receiving—potentially in cooperation with any of antenna(e) 1434—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1412 may further include hardware, firmware, or software for receiving GNSS signals. The transceiver(s) 1412 may include any known receiver and baseband suitable for communicating via the communications protocols utilized by the VCMD 1400. The transceiver(s) 1412 may further include a low noise amplifier (LNA), additional signal amplifiers, an analog-to-digital (AID) converter, one or more buffers, a digital baseband, or the like.

The sensor(s)/sensor interface(s) 1410 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The camera(s) 1414 may be any device configured to capture ambient light or images. The microphone(s) 1416 may be any device configured to receive analog sound input or voice data.

It should be appreciated that the program module(s), applications, computer-executable instructions, code, or the like depicted in FIG. 14 as being stored in the data storage 1420 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the VCMD 1400, and/or hosted on other computing device(s) accessible via one or more networks, may be provided to support functionality provided by the program module(s), applications, or computer-executable code depicted in FIG. 14 and/or additional or alternate functionality. Further, functionality may be modularized differently such that processing described as being supported collectively by the collection of program module(s) depicted in FIG. 14 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 14 may be implemented, at least partially, in hardware and/or firmware across any number of devices.

It should further be appreciated that the VCMD 1400 may include alternate and/or additional hardware, software, or firmware components beyond those described or depicted without departing from the scope of the disclosure. More particularly, it should be appreciated that software, firmware, or hardware components depicted as forming part of the VCMD 1400 are merely illustrative and that some components may not be present or additional components may be provided in various embodiments. While various illustrative program module(s) have been depicted and described as software module(s) stored in the data storage 1420, it should be appreciated that functionality described as being supported by the program module(s) may be enabled by any combination of hardware, software, and/or firmware.

It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as submodule(s) of other module(s).

One or more operations of the methods, process flows, and use cases of FIGS. 1-7 may be performed by a device having the illustrative configuration depicted in FIG. 14, or more specifically, by one or more engines, program module(s), applications, or the like executable on such a device. It should be appreciated, however, that such operations may be implemented in connection with numerous other device configurations.

Figure 15:
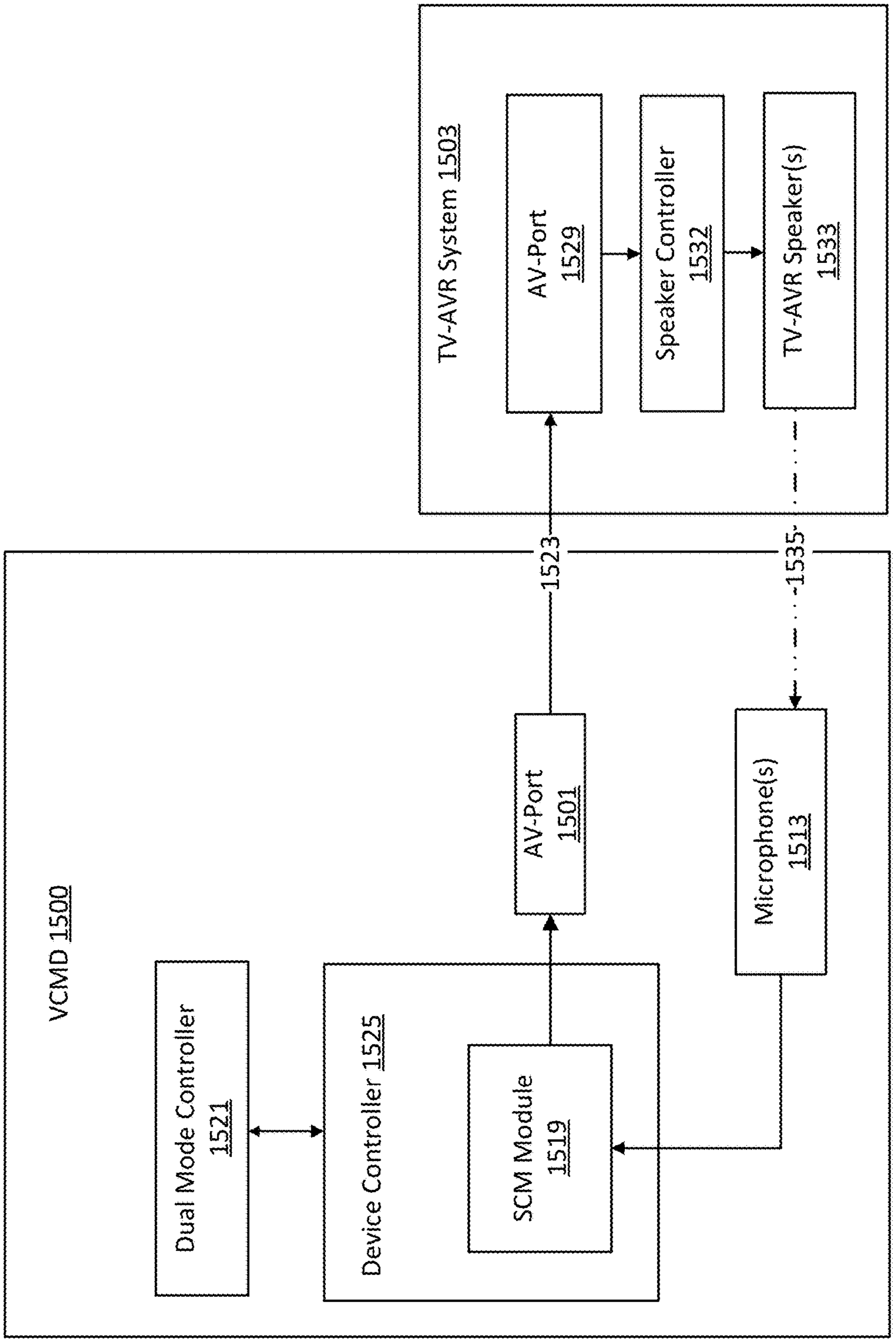
FIG. 15 shows a voice-controlled multimedia device capable of TV-AVR state detection and monitoring in accordance with one or more embodiments of the disclosure.

FIG. 15 shows a VCMD 1500 capable of TV-AVR state monitoring according to certain embodiments. More specifically, the VCMD 1500 is configured to employ a process referred to herein as sub-audible channel monitoring (SCM). SCM is a process that can be used by a VCMD, e.g., the VCMD 300 shown in FIG. 3, to determine the state of the connected TV-AVR system, e.g., whether or not the VCMD 1500 is in focus on the TV-AVR system 1503, and whether or not the volume of the TV-AVR system is set to an audible level. According to certain embodiments, a VCMD employing SCM can cause a sub-audible probe signal, such as a pseudo-random audio signal that sounds like white noise, to be played from one or more speakers of the TV-AVR system. The VCMD can then detect the sub-audible sound signature of the probe signal using one or more internal microphones, e.g., internal microphone system 1513. To further illustrate a VCMD system that can employ SCM, FIG. 15 shows a VCMD 1500 with only the SCM relevant system blocks shown and all other system blocks removed for the sake of clarity. Examples of a full VCMD are described above in reference to FIG. 3.

According to certain embodiments, SCM module 1519 can be part of the device controller 1525. SCM module 1519 is one embodiment of the state monitor 319 first introduced above in reference to FIG. 3. Both dual mode controller 1521 and device controller 1525 can be connected to a speech interaction manager (not shown) and ultimately to a voice recognition service (not shown) and are described in more detail above in reference to FIGS. 3-11. VCMD 1500 includes an AV-port 1501 that can be connected to AV-port 1529 of the TV-AVR system 1503, e.g., by way of an electrical interconnect 1523, such as an HDMI cable and the like. VCMD 1500 further includes an internal microphone system 1513 that can detect the ambient sound in the vicinity of the of the VCMD, e.g., in a manner that is described above in reference to FIG. 3.

In some embodiments, an SCM process running on the SCM module 1519 can be repetitively and/or synchronously monitoring the state of the TV-AVR system automatically, e.g., several times a second. In some embodiments, the SCM process can operate asynchronously, e.g., the SCM process could be initiated by a command that is sent to the SCM module 1519. For example, in response to the detection by VCMD 1500 of a wakeword, the dual mode controller 1521 could send a command to SMC module 1519 to initiate the SCM process. Whether operating synchronously or asynchronously, SCM begins when SCM module 1519 generates and transmits an SCM probe signal via electrical interconnect 1523.

The probe signal can be, e.g., an electrical signal that is transmitted via an HDMI connection, a wireless signal sent via a wireless connection, or any other suitable signal sent using any wired or wireless connection. In one example, SCM module 1519 can generate the probe signal as audio data, e.g., uncompressed PCM audio, and can transmit the audio data via any available audio channel using digital audio data transfer protocols, e.g., such as those contained in the HDMI specification. In cases where the current output encoding for the audio speakers in known, rather than using PCM audio, the SCM module can generate an appropriately encoded audio signal, e.g., Dolby encoded audio, and the like.

The probe signal can include a predetermined waveform that is to be output by the TV-AVR speakers 1533. For example, the probe signal can include a pseudo-random audio signal that, to a user, sounds like white noise when played out of the TV-AVR speakers 1533. According to certain embodiments, the probe signal can include a pseudo-random bit sequence, such as a Maximum Length Sequence (MLS) and the like.

Internal microphone system 1513 can detect the ambient sound in the room and generate a corresponding microphone signal that is provided back to SCM module 1519. As described in further detail below in reference to FIG. 16, SCM module 1519 can process the corresponding microphone signal to determine whether or not the predetermined waveform is present at some detectable level in the ambient sound in the room. If so, SCM module 1519 can inform dual mode controller 1521 of the TV-AVR state, e.g., TV_STATE=ON or TV_STATE=OFF. In addition, SCM module 1519 can store the TV-AVR in memory as part of an overall TV-AVR System_Context that describes one or more stats of the various components of the TV-AVR system.

In FIG. 15, a generalized form of a TV-AVR system is shown that include at least one AV port 1529, a speaker controller 1532, and TV-AVR speaker 1533. As with AV port 1501, AV port 1529 can be any port associated with any type of audio or multimedia interconnect, e.g., optical audio, HDMI, DVI, DisplayPort, VGA, and the like. The speaker controller 1532 includes circuitry and software for taking the signal received at AV port 1529 and causing output audio 1535 to be played by the TV-AVR speaker 1533. While the TV-AVR system 1503 is shown in FIG. 15 as a simplified block diagram to avoid complication, as already noted above in reference to FIG. 3, the TV-AVR system can take any form. For example, VCMD 1500 can be connected directly to a TV having only an internal speaker, to a TV connected to an external speaker or sound bar, or can be connected indirectly to a TV by way of an AVR that is itself connected to one or more external speakers. As such, any TV-AVR topology is possible without departing from the scope of the present disclosure.

Figure 16:
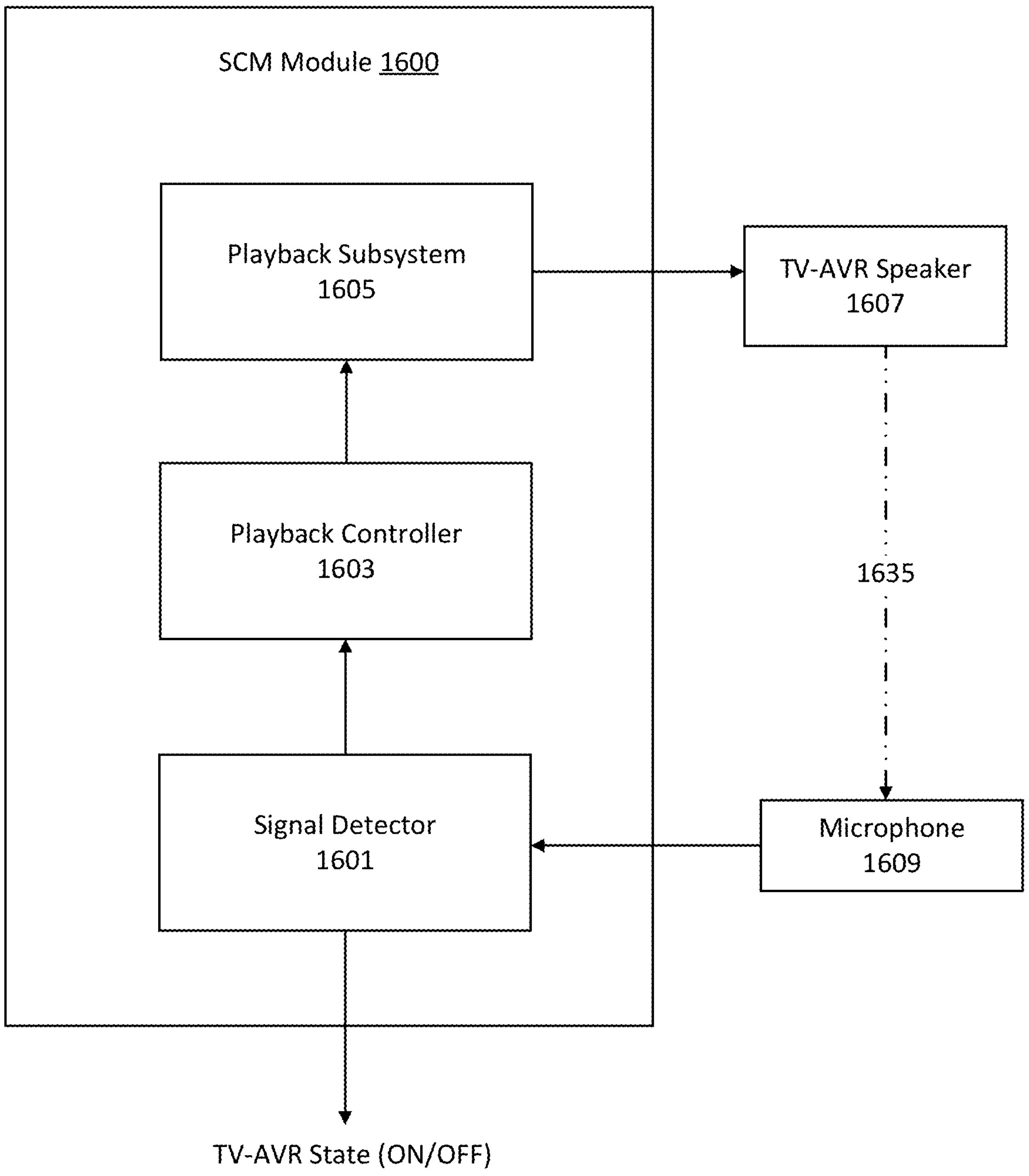
FIG. 16 shows an illustrative example of an sub-audible channel monitoring module in accordance with one or more embodiments of the disclosure.

FIG. 16 shows an illustrative example of an SCM module 1600 in accordance with one or more embodiments, e.g., SCM module 1600 shows additional internal details of an SCM module, e.g., SCM module 1519 described above in reference to FIG. 15. SCM Module 1600 includes a signal detector 1601, a playback controller 1603, and a playback subsystem 1605. As described above in reference to FIG. 15, SCM module 1600 can be connected to the TV-AVR speaker 1607 such that it causes a probe signal sound 1635 to be output from the TV-AVR speaker 1607. According to certain embodiments, predetermined probe signal audio data for generating the probe signal sound 1635 can be stored in a non-transitory computer readable memory that is located within, or operably connected to, any of the subcomponents of the SCM module 1600 or even may be stored in memory located outside of the SCM module 1600. Alternatively, to reduce memory size, the probe signal audio can be regenerated each time the SMC process is triggered.

Microphone system 1609 can detect a microphone signal that includes ambient room noise and, depending on the state of the TV-AVR system, may or may not include a detectable level of the probe signal sound 1635. The signal detector 1601 can include one or more processors capable of generalized computation including central processing units with or without vector instruction sets, one or more digital signal processors (DSPs), one or more ARM chips or graphical processing units GPU, and the like, that are programmed to perform a cross-correlation measurement process using the original probe signal and the detected microphone signal. FIG. 14 provides additional description of hardware that can be employed for one or more system components of the SCM module 1600. The hardware of signal detector 1601 is programmed to perform signal processing on the microphone signal to determine a power level of the of the probe signal within the microphone signal as described in further detail below in reference to FIG. 17. Based on the determined power level, the signal detector 1601 can output an indication of the TV-AVR state to be used by other system blocks, e.g., by a dual mode controller or by a device controller as described above in reference to FIG. 15.

In some embodiments, as described in further detail below in reference to FIG. 18, the SCM module 1600 may operate within a feedback loop to control the volume of the probe signal to improve the likelihood of accurate TV-AVR state detection while also ensuring that the volume of the probe signal stays below an audible level to avoid an unpleasant user experience.

In one example of the feedback loop, it can be the case that if the signal detector 1601 does not detect the presence of the probe signal within the microphone signal, it could be due to two possible scenarios: 1) the TV-AVR system is in a power OFF (or more generally in a "not-in-focus state"); or 2) the TV is in a power ON state but the volume of the probe signal is just too low to be detected. In case 2), the signal detector 1601 can send an indication to the playback controller 1603 that the probe signal has not been detected. In response, the playback controller 1603 can send a command to the playback subsystem to increase the gain of the probe signal before it is output to the TV-AVR system.

Figure 17:
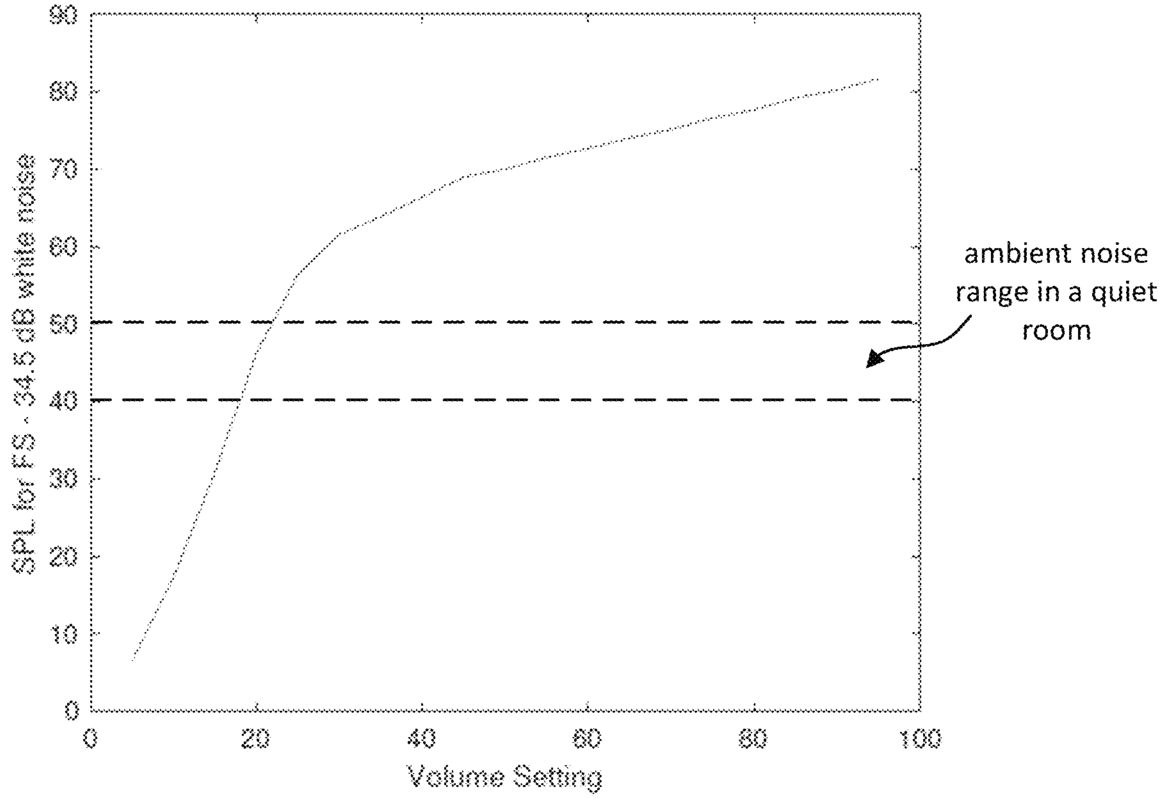
FIG. 17 shows a measurement of sound pressure level (SPL) as a function of TV volume (0-100%) using a white noise probe having a level of 34.5 dB below full scale in accordance with one or more embodiments of the disclosure.

In order to ensure that the gain factor employed by the SCM module 1600 is properly calibrated to correspond to known levels of sound output from the TV-AVR speaker 1607, during setup the VCMD can automatically perform (or guide the user to perform) a volume calibration procedure as part of the setup process. The volume calibration process can measure the probe volume for various values of the TV-AVR system volume. To completely characterize the system and thus know the output probe sound level relative to different TV volume levels and different gain factors, the VCMD can perform a calibration procedure during setup that can sample a curve like that shown in FIG. 17 for various values of the gain factor/probe level. More specifically, FIG. 17 shows test results for a measurement of TV speaker sound pressure level (SPL) as a function of TV volume (0-100%) using a white noise probe having a level of 34.5 dB below full scale (−34.5 dBfs) using a commonly available consumer TV.

In some embodiments, a full calibration curve need not be sampled but instead, a maximum gain threshold value can be stored in memory that is accessible by the playback controller 1603 such that the volume of the probe signal will not exceed a decibel level that is higher than the threshold for user perception. The noise level in a quiet home is approximately 40 dB SPL and the noise level in a typical conference room is approximately 50 dB SPL. Furthermore, a point source of white noise can be detected by a human that is 1 m away if the point source sound pressure level is approximately 20 dB lower than the room noise level or higher, i.e., the threshold for human detection in a quiet room in a typical house is approximately 20 dB SPL. Thus, for the system measured in FIG. 17, the probe signal (which has a gain of −34.5 dBfs) could become detectable (audible) at a TV volume setting of approximately 12%. Accordingly, a probe gain level of much less than −35.5 dBfs should be used to avoid detection by user that is located 1 m away from the speakers. Additional tests have shown that probe gains of −90 dBfs result in a measured probe level of around 27 dB SPL at 100% TV volume. Thus probe gains of −90 dBfs can be used if it is assumed that the user is only going to use volume levels on the low end of the volume settings. For example, in the test that resulted in the data shown in FIG. 17, the amplification of the TV is reduced by approximately 45 dB at 20% volume. At this level, the probe signal that was at 27 dB SPL at full volume is now reduced to −18 dB SPL. However, to ensure that the probe signal is not audible for all volume levels, a probe gain of less than −90 dBfs can be used. Additional empirical studies of the SCM module have shown that the probe signal can be detected with probe sound levels as low as −18 dB SPL, even with microphones that exhibit self-noise at around 40 dB SPL. Thus, according to certain embodiments, the maximum gain threshold of the probe signal can be set to produce a probe level that is higher than around −18 dB SPL but does not exceed 20 dB SPL over a range of max TV volumes for common TV models (as measured 1 m from the source TV speaker). In some embodiments, the maximum gain threshold can be set to ensure that the probe level is less than or equal to 15 dB SPL.

Figure 18:
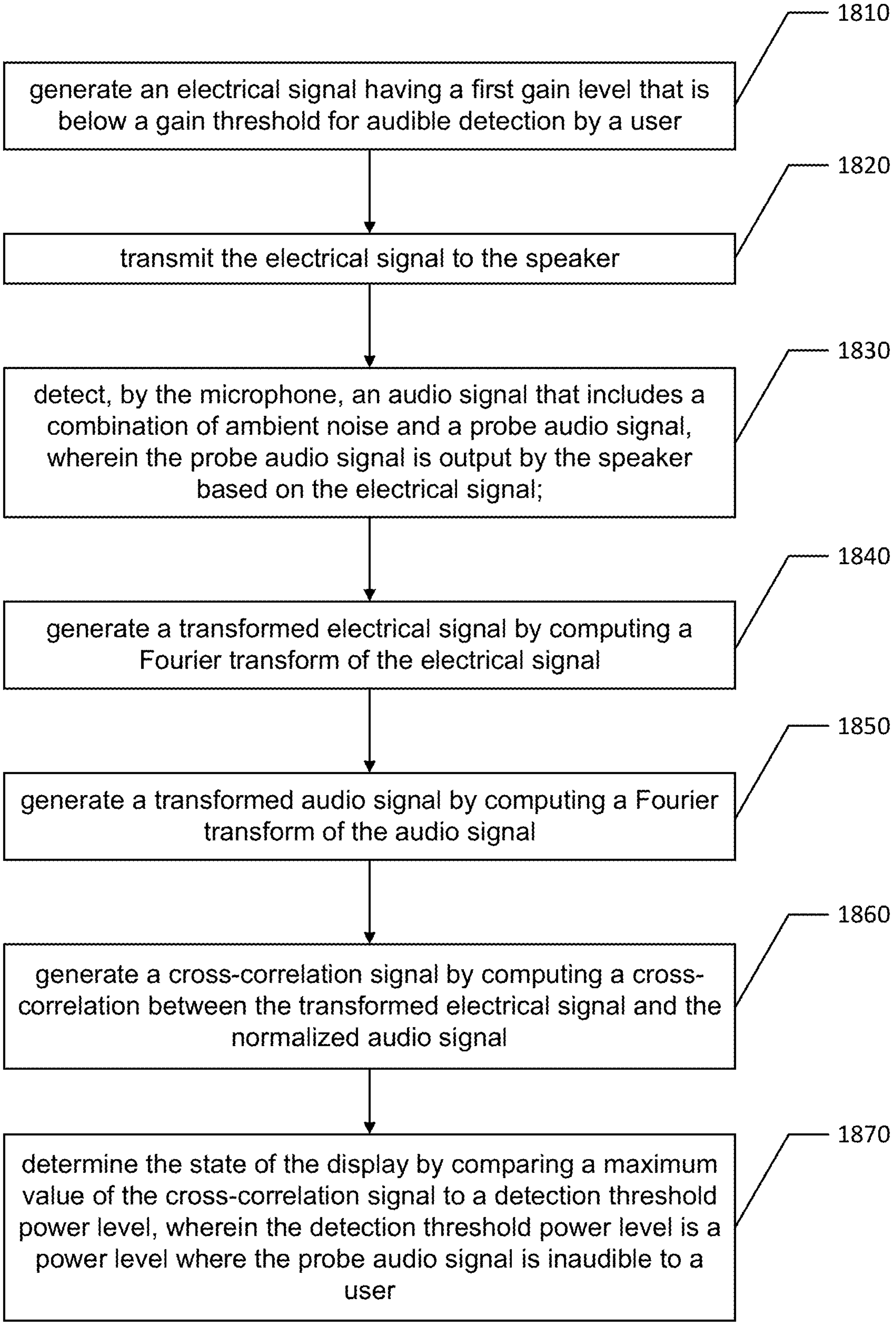
FIG. 18 is a flowcharts that conceptually illustrates a process for sub-audible channel monitoring in accordance with one or more embodiments of the disclosure.

FIG. 18 is a flowchart that conceptually illustrates a process for SCM according to examples of the present disclosure. For example, a VCMD such as VCMD 300 can employ a state monitor 319 that can include one or more SCM modules, such as SCM modules 1519 and 1600, as described above in reference to FIGS. 15-16.

In step 1810, the VCMD can generate an electrical signal having a first gain level that is below a gain threshold for audible detection by a user. In some embodiments, the electrical signal can include a predetermined waveform such as pseudo-random number sequence or the like. For example, the playback controller 1603 can generate PCM audio that corresponds to a MLS. In some embodiments, the probe signal can be a wide-band signal, a band-limited signal at higher frequencies, e.g., 12-24 kHz, a band-limited signal at low frequencies, e.g., 0-100 Hz, or a wide-band signal having a weighted frequency response. In some embodiments, the probe signal can be any signal or predetermined waveform that resembles white-noise, when output from a speaker.

In step 1820, the electrical signal is transmitted, e.g., over an HDMI connection, to one or more speaker(s) that is operatively coupled to a display of the TV-AVR system.

According to certain embodiments, in response to receiving the electrical signal the one or more speaker(s) can emit an audio signal that corresponds to the predetermined waveform of the electrical signal (e.g., the MLS). In some embodiments, the probe signal may be used to generate a probe audio signal, which can be a white-noise-like sound, from the speakers.

In step 1830, the microphone detects an audio signal that includes a combination of ambient noise and the probe audio signal. The ambient noise can include any background noise from the local environment of the VCMD (e.g., the room in which the VCMD is located). The audio signal detected by the internal microphone of the VCMD is also referred to herein as the microphone signal. For the sake of brevity, the local environment is referred to as a room in this specification but can be any local environment. As described above in reference to FIG. 16, the detected audio signal is an electrical signal that can be further processed by a signal detector, e.g., signal detector 1601 of SCM module 1600, as described above in reference to FIG. 16.

While the cross-correlation can be computed in any manner without departing from the scope of the present disclosure, FIG. 18 shows one example where the cross-correlation is computed in the frequency domain. Accordingly, in step 1840, a Fourier transformed electrical signal is computed and in step 1850, a Fourier transformed audio signal is computed. As would be appreciated by one of ordinary skill in the art with the benefit of this disclosure, the Fourier transform of the electrical signal need not be computed in real time, and could be computed prior to the SCM process and stored in memory, in which case, step 1840 can be eliminated.

Figure 20A:
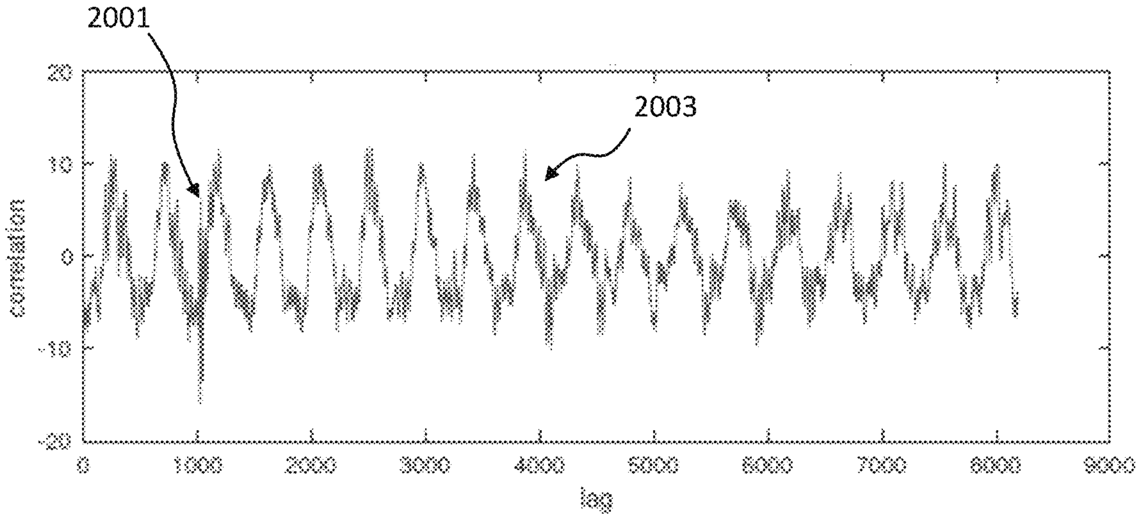
FIGS. 20A-20B shows the result of a direct cross-correlation computation in accordance with one or more embodiments of the disclosure.
Figure 20B:
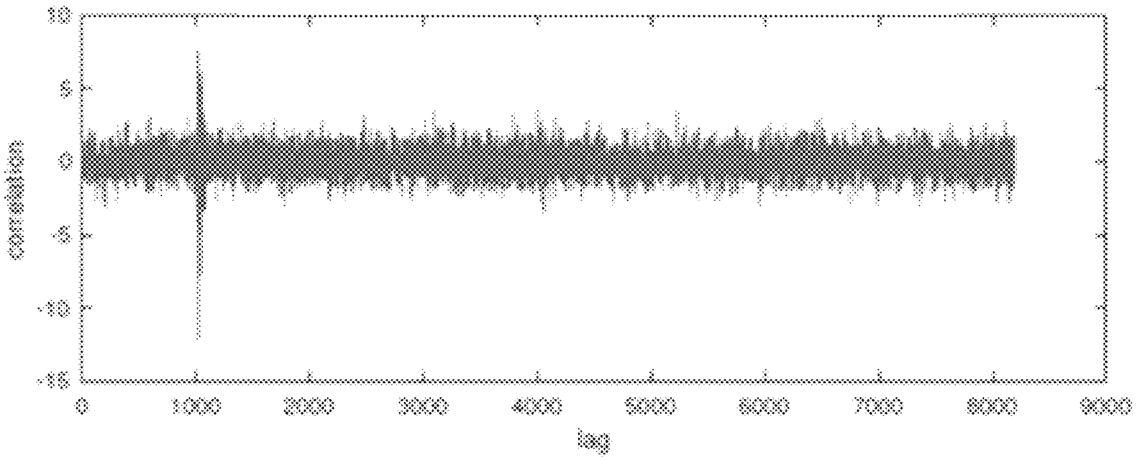

In step 1860, the signal detector computes a cross-correlation of the electrical signal with the audio signal. As noted above, while this example computes the cross-correlation in the frequency domain, the cross-correlation can also be computed directly in the time domain according to the following $$y(t) = \sum_{i=0}^{T} x(i) \cdot m(t-i) \quad (1)$$

where m is the audio signal, x is the electrical signal, T is the length of the cross-correlation in samples, t is the index of the received audio signal, e.g., the index of the most recent sample. FIGS. 20A-20B shows the result of a direct cross-correlation computation. As illustrated in FIG. 20A, a peak 2001 in the cross-correlation is visible, indicating that the probe audio signal could, in principle, be detected within the audio signal, but a high-amplitude interference signal 2003, which is substantially periodic, is also present. If the amplitude of the interference signal 2003 is too great, the amplitude of the interference signal could easily exceed the amplitude of the probe peak, thereby making it difficult to utilize a simple peak detection process to detect the presence of the probe audio signal.

In some embodiments, the probe signal can be engineered to allow for the elimination of interfering noise signals in the cross-correlation. For example, in some embodiments, a pseudo-random probe signal can be chosen to have a flat frequency response over a certain range. Noise suppression methods can then exploit the knowledge that any time-frequency bins that fall outside the expected range are likely caused by interfering sources. One method for reducing the noise is to apply a phase transform in the frequency domain. The phase transform M' is a transformation that normalizes the energy of each time-frequency bin while retaining the phase information and can be computed as follows $$M'(t, f) = \frac{M(t, f)}{|M(t, f)|} \quad (2)$$

where M(t, f) is the complex short time Fourier transform (STFT) of the audio signal at time t and frequency $f$. In this case, the phase transformed cross-correlation signal can be computed as follows $$y_{pt}(t) = \mathcal{F}^{-1}(X \cdot M'(t,f)) \quad (3)$$

where $\mathcal{F}^{-1}$(f) is the inverse Fourier transform of the function $f$, and X is the short time Fourier transform of the electrical signal, and M'(t, f) is the phase transformed audio signal, also referred to herein as the normalized audio signal.

In some embodiments, the phase transformed signal can perform better than a bare cross-correlation computed in the time domain. For example, the bottom panel of FIG. 20 shows the phase transformed cross-correlation on sample data. As is clearly seen in data, the interfering noise signal is removed, thereby resulting in improved signal detection capabilities of the signal detector according to certain embodiments.

In some embodiments, in addition to, or alternatively to, applying a phase transform to the audio signal, the signal detector can also compensate for a distortion of the probe signal due to reflections and other effects that originate from the local acoustic conditions within the room. For example, room effects can be modeled via a Room Impulse Response (RIR) function h such that the received audio signal m can be computed via a convolution with h as follows $$m(t) = \sum_{i=0}^{T} h(i) m_0(t-1) \quad (4)$$

where $m_0$ is the time domain corrected audio signal assuming no room-induced distortions. Accordingly, in the frequency domain, the convolution of Eq. (4) can take the form of a multiplication as follows $$M(k) = H \cdot M_0(k) \quad (5)$$

where M(k) is the Fourier transform, e.g., the STFT, of the audio signal m(t), $M_0(k)$ is the Fourier transform, e.g., the STFT, of the undistorted audio signal, and H is a diagonal matrix where the diagonal is the frequency domain representation of h. In some embodiments, the signal detector can apply the inverse RIR function to the measured audio signal to approximate the undistorted audio signal $M_0$ (k), also referred to herein as the frequency domain corrected audio signal:

$$M_0(k) = H^{-1} \cdot M(k) \quad (6)$$

Accordingly, to determine an improved cross-correlation, the approximation to the idealized audio signal can be used instead of the measured audio signal. Alternatively, to leverage the phase transformed data described above in reference to Eqn. (3), in some embodiments, a corrected cross-correlation signal that takes the RIR into account can be computed by applying a matched filter to the cross-correlation of the phase transformed signal as follows $$y_{pt,RIR}(t) = \sum_{i=0}^{T} y_{pt}(i) \cdot h(t-i) \quad (7)$$

In yet another example, a time domain corrected audio signal $m_0(t)$ can be generated by computing the inverse Fourier transform of Eqn. (6). This time domain corrected audio signal can then be used to generate the cross-correlation signal by the application of Eq. (1), i.e., by taking the cross-correlation of time domain corrected audio signal $m_0(t)$ with electrical signal x(t).

Figure 21A:
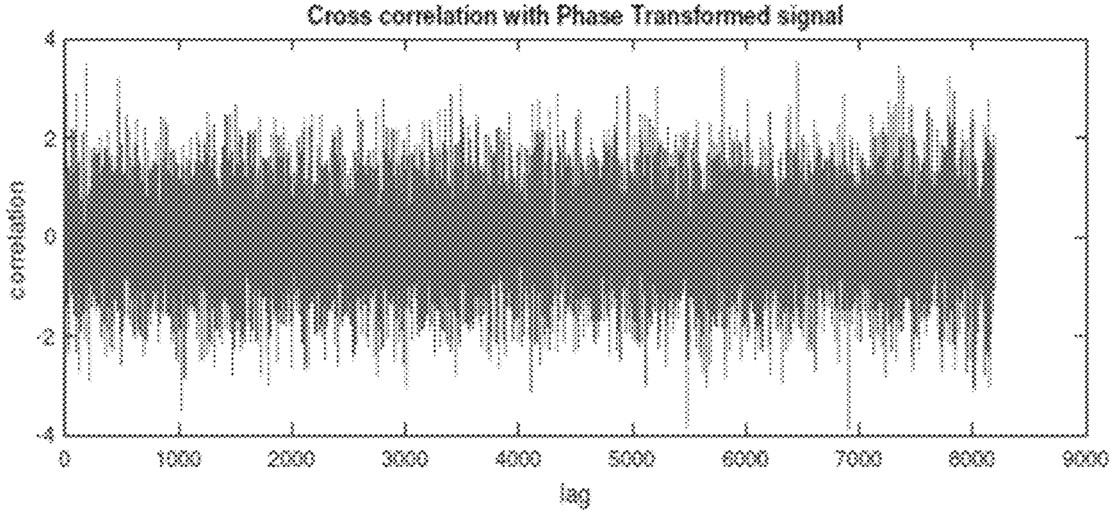
FIGS. 21A-21B show plots of the cross-correlation of the electrical signal with a microphone signal in accordance with one or more embodiments of the disclosure.
Figure 21B:
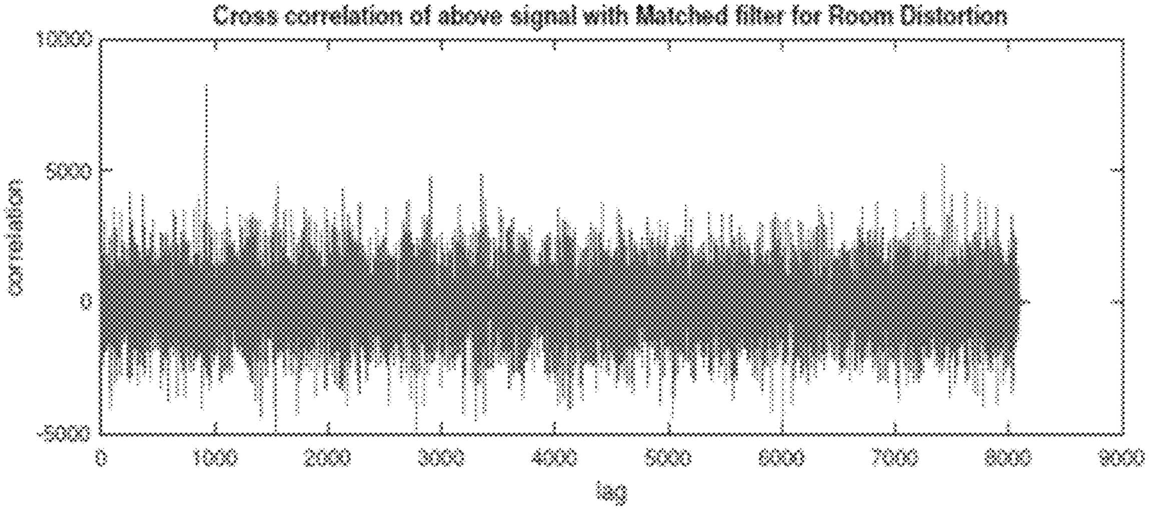

FIG. 21A is a plot of the cross-correlation of the electrical signal with the phase transformed audio signal according to an embodiment of the present invention. FIG. 21B is a plot of the cross-correlation of the phase transformed audio signal with a matched filter according to an embodiment of the present invention. As illustrated in FIG. 21B, in which the probe peak 2101 is visible, cross-correlating the phase transformed audio signal with the RIR function results in greatly increased signal-to-noise and thus sensitivity. In comparison, the probe peak is not visible in FIG. 21A that presents data not including the effects of the ambient noise and/or impacts of the room environment, the speaker and microphone transfer functions, and the like.

In some embodiments, it can be the case that the length of the RIR is longer than the window of any STFT being applied, in which case, an overlap-add method can be applied as follows $$Y(k) = \sum_{j=0} H_j(k)X(k) \tag{8}$$

In step 1870, the power level of the probe signal can be determined by utilizing a peak detector in conjunction with the cross-correlation signal y. In some embodiments, the peak detector can find the maximum value of the cross-correlation as follows $$y_{max} = \max_{i=0}^{T}(y(i)) \tag{9}$$

In some embodiments, e.g., for a very low level probe signal, a number of different techniques can be employed to improve the detection efficiency of the peak detector. For example, in some cases, in order to avoid detection of the probe signal by the user, the level of the probe signal can be set as low as −90 dBfs. At such a low level (−90 dBfs corresponds to the last digit of a signed 16 bit integer) it may be difficult to identify $y_{max}$ using the processing discussed above in reference to Eqns. (1)-(8). To overcome this problem, several different techniques can be employed. For example, a longer correlation time can be chosen for the cross-correlation computation (larger 7). Alternatively, or in addition to the longer correlation time, one or more infinite impulse response (IIR) or finite impulse response (FIR) filters can be employed. For example, the cross-correlation can be filtered over several iterations as follows $$y(t) = \sum_{i} a_i y_i(t) \tag{10}$$

where $\alpha_i$ are the coefficients of the filter. According to other embodiments, running values of the cross-correlation can be kept by applying a recursive integrator of the form $$\hat{y}_i(t) = \beta\vec{y}_{i-1}(t) + (1-\beta)y(t) \tag{11}$$

where y(t) are the values of the cross-correlation that are measured in the ith iteration, $\hat{y}_{1-1}(t)$ are the filtered value that were computed during the last (i−1th) iteration, and $\hat{y}_i(t)$ are the updated filtered values computed at the ith iteration. The integration constant $0<\beta<1$ is chosen according to how much weight to place on the historical values relative to the newly acquired data, with larger values for leading to a higher weight being applied to historic values relative to the new values (e.g., if $\beta=1$, the updated value would always be equal to the historical value; likewise for $\beta=0$ the updated value would always be the newest value regardless of the magnitude of the historical values).

Returning to FIG. 18, in step 1870, the state of the TV-AVR system display is determined. In some embodiments, the system can determine the TV-AVR display power state (ON/OFF), the AV channel latency, and/or TV-AVR system volume. In relation to TV-AVR display power state, the maximum value of the detected peak $y_{max}$ can be compared to a to a detection threshold power level. The detection threshold power level is a power level of the probe audio signal that is inaudible to a user. In some embodiments a state detector can be implemented by testing whether or not a normalized value of the cross-correlation peak is equal to or exceeds the detection threshold power level a. For example, the signal detector can implement the following state detector (SD)

$$SD(t) = \begin{cases} \text{ON}, & \text{if } ind(t) \geq \alpha \\ \text{OFF}, & \text{otherwise} \end{cases} \tag{12}$$

where $$ind(t) = \frac{y_{max}}{y_{avg}} \tag{13}$$

and the average value of the cross-correlation signal is given by $$y_{avg} = 1/T\sum_{i=0}^{T} y(i) \tag{14}$$

The probe audio signal includes information that is useful in relation to determining the AV channel latency as well as the TV-AVR volume. For example, the AV channel latency 1, defined to be the time shift between the electrical signal and the probe audio signal output from the speakers can be computed from the cross-correlation signal y as follows $$l = \arg\max_i y(i) \tag{15}$$

In some embodiments, it may be advantageous to employ a probe signal that is shorter than the average latency of the AV channel. For example, the playback duration of a probe sequence of length 1024 samples at 48 kHz is 0.02 seconds, but common latency values over HDMI can vary from 0.1 seconds to 0.2 seconds. In such a case in which the latency is longer than the playback duration of the probe signal, then a number of methods can be used to identify which detected audio signal corresponds to the appropriate probe signal (also referred to as "unwrapping"). One method includes playing several time-shifted versions of the same probe signal, in which case, the time difference between the peaks of the cross-correlation can be used to determine the unwrapping.

For the case where the TV-AVR system volume is also estimated in step 1870, one or more embodiments can leverage the initial volume calibration that could be accomplished during setup as described above in reference to step 1860. The max value of the cross-correlation $y_{max}$ depends on the TV-AVR volume level v according to the following relationship $$y_{max} = \text{argmax}_t \sum_{i=0}^{T} x(i) \cdot v \cdot m(t-1) \quad (16)$$

Accordingly, the relative volume level (0-100%) of the TV-AVR system can be computed from the maximum value of the cross-correlation using the following:

$$v_{rel} = \frac{y_{max}}{v_{ref}} \quad (17)$$

where $v_{ref}$ is a reference gain determined during the setup process. In general, the mapping between TV-AVR volume and probe signal volume may not be linear, e.g., as shown in FIG. 17 so the linear relationship shown in Eq. (17) may not apply for all cases. However, during the setup process the full mapping from probe volume to TV-AVR volume can be determined, stored in memory, and used instead of Eq. (17), if necessary.

Figure 19:
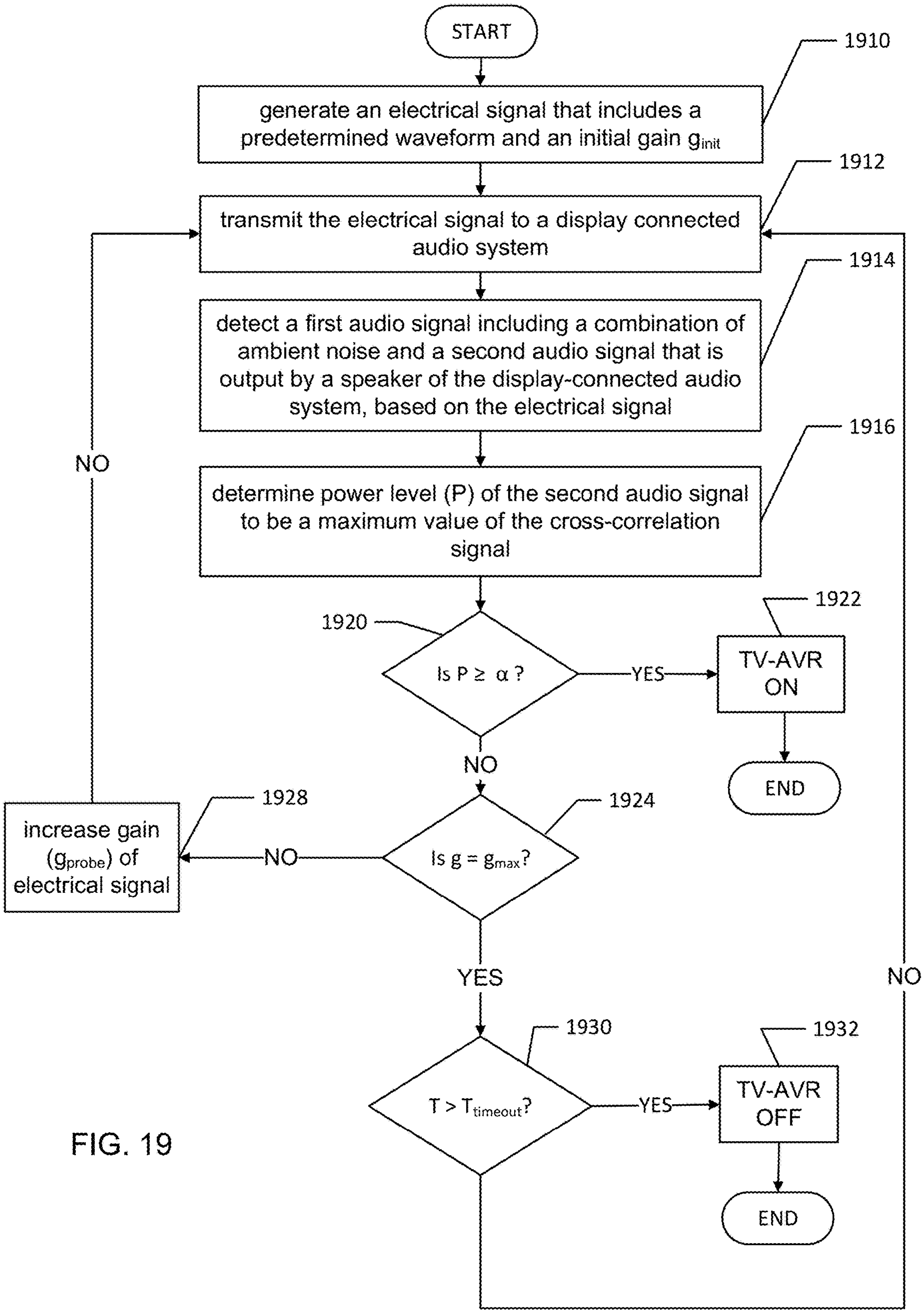
FIG. 19 shows a flowchart that conceptually illustrate a process for tracking and controlling the probe volume level in accordance with one or more embodiments of the disclosure.

FIG. 19 shows a flowchart that conceptually illustrate a process for tracking and controlling the probe volume level according to examples of the present disclosure. More specifically, according to certain embodiments, the system can balance the objectives of keeping the probe signal loud enough that it is detectable by the signal detector but quiet enough that it is sub-audible, i.e., it cannot be heard by a user. In the method described below, the maximum level of the probe signal is capped by capping the gain of the probe $g_{probe}$ to be some value $g_{max}$, where $g_{max}$ is set to ensure that the probe signal is detectable by the signal detector yet still a sub-audible to the user. If the system detects that the probe has been at its maximum gain level for some predetermined duration of time (referred to herein as the "timeout time") as measured by a timeout timer, and the system has still not detected the presence of the probe signal, the signal detector will determine the TV-AVR system to be in the OFF state and terminate, at least temporarily, SCM. Further details of the method are described below.

Steps 1910-1914 correspond to steps 1810-1830, respectively of FIG. 18. Likewise, step 1916 corresponds to steps 1840-1870 and results in a probe power level P being computed by the signal detector as described above in reference to FIG. 18. The details of these steps will not be reproduced here other than to note that in this example, the gain $g_{probe}$ of the probe signal is initially set to a lower bound, $g_{init}$ and then iteratively increased until the probe is detected or a time associated with the probe signal being at $g_{max}$ exceeds a timeout value. In one example, the system can start the timer at any point in the process, e.g., concurrently with any of steps 1910-1920.

In step 1920, the probe power level P (also referred to as ind(t) above in reference to Eq. (13)) is compared to an SCM detection threshold power α. If P is greater than or equal to α, the signal detector considers the probe to be detected and updates the TV-AVR state accordingly. For example, the SCM module can set a binary TV-AVR state parameter to "ON", or the like. In other embodiments, the SCM module can also store the value of P so as to also track the volume level of the TV-AVR system, as described above in reference to FIG. 18. If P is less than the detection threshold α, the method proceeds to step 1924.

In step 1924, a determination is made if the gain $g_{probe}$ of the probe signal has reached the maximum gain $g_{max}$. If $g_{probe}$ is equal to $g_{max}$, then the method proceeds to step 1930. If the probe signal is not yet at $g_{max}$, the method proceeds to step 1928 where the gain of the probe signal is incremented. For example, the gain can be increased by some predetermined increment. As would be appreciated by one of ordinary skill in the art with the benefit of this disclosure, $g_{max}$ can be set to a number of different values, depending on the nature of the TV-AVR system. For example, $g_{max}$ could be set to −90 dB fs, −96 dB fs, or even −140 dB fs for some high-end audio systems that have very high amplifier gains. In some embodiments, $g_{max}$ can be set to whatever value is desired to ensure that the probe signal power level never reaches an audible level, i.e., a level that is detectable by a user, as described above in reference to FIG. 17.

In some embodiments, step 1928 can not only increase the gain but can implement a gain control loop that can both increment and decrement the gain based on the measured value of probe power level. In such a case, the modification of the gain can depend on whether the measure probe power falls within one or more ranges, with the ranges being delineated by one or more probe power threshold values. For example, the gain can be updated according to the following multi-threshold updating procedure that depends on the normalized peak value in the cross-correlation $$g_{t+1} \leftarrow g_t + \begin{cases} 5\text{ dB} & \text{if } ind(t) < 30 \\ 0\text{ dB} & \text{if } ind(t) \geq 20 \wedge ind(t) < 50 \\ -2\text{ dB} & \text{if } ind(t) \geq 50 \wedge ind(t) < 200 \\ -5\text{ dB} & \text{if } ind(t) > 200 \end{cases} \quad (18)$$

As can be appreciated by one of ordinary skill in the art, any type of updating procedure can be employed without departing from the scope of the present disclosure. In addition, the procedure set forth in FIG. 19 can be implemented using any type of controller, e.g., using a PI controller, PID controller, any type of fuzzy logic-type controller, and the like.

Once $g_{probe}$ is equal to $g_{max}$, a determination is made at 1930 whether the system has been at its max probe signal gain setting $g_{max}$ for longer than the timeout time $T_{timeout}$. If the system has reached $g_{max}$ and $T_{timeout}$ has been passed, then in step 1932, the signal detector can set the TV-AVR state parameter "OFF" and then terminate the current SCM process loop. In some embodiments, because the probe signal is inaudible, there is no need to termination the SCM loop and the probe signal can be played continuously without risk of detection by a user. In such a case, after the timeout time has been passed, the signal detector can set the TV-AVR state parameter "OFF" and the probe signal will continue to be output.

In some embodiments, step 1928 can be accompanied by or replaced by a process by which the integration time (T) over which the cross-correlation is computed is increased. For example, in one embodiment, if g has hit $g_{max}$ and there is still no detection of a large enough peak by the signal detector, then the integration time for computing the cross-correlation can be increased in an attempt to increase signal-to-noise. In such a case, the timeout time may also be modified to ensure that it is set to a time that is larger than the newly increased integration time.

Figure 22:
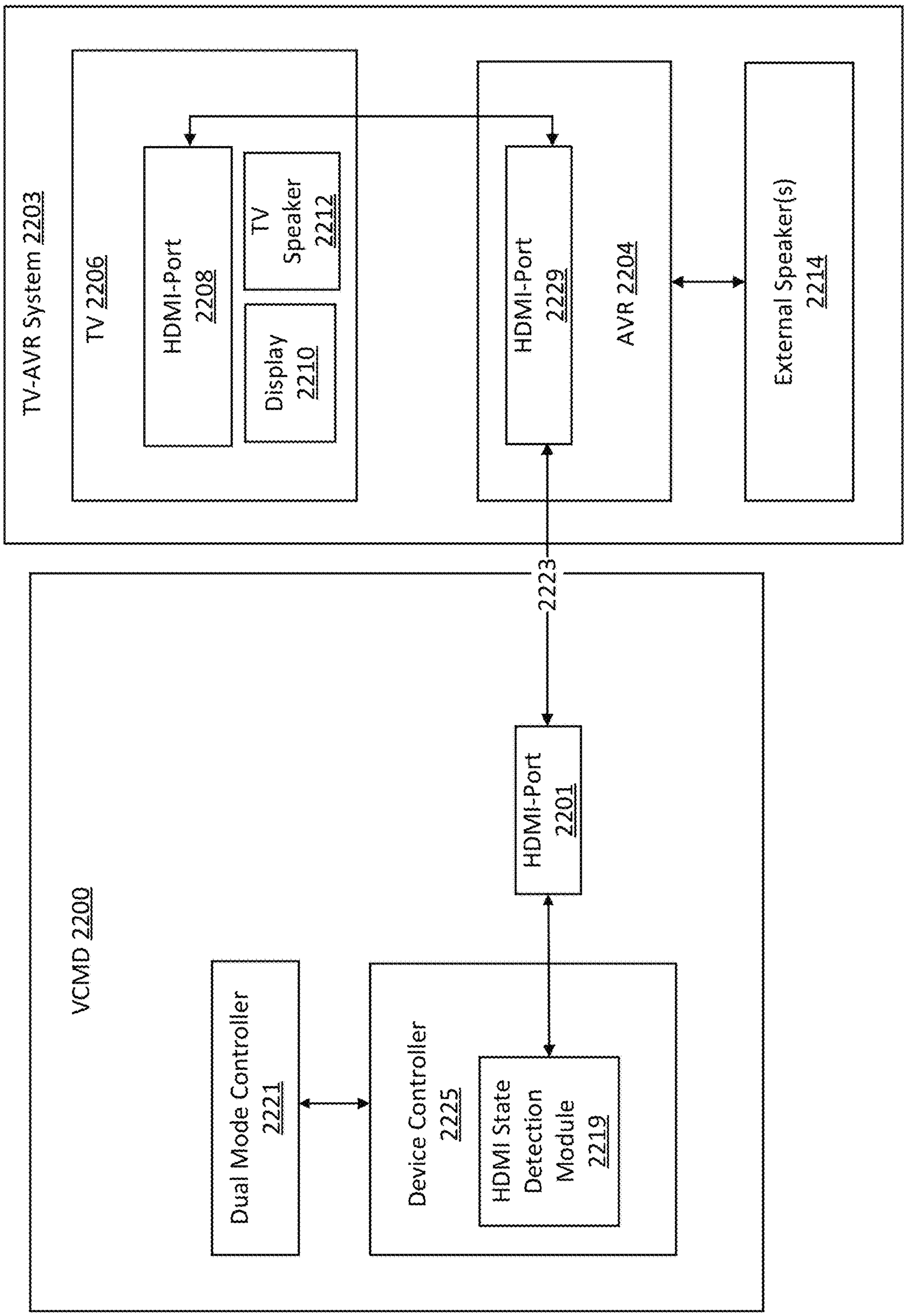
FIG. 22 shows a voice-controlled multimedia device capable of TV-AVR state detection and monitoring in accordance with one or more embodiments of the disclosure.

FIG. 22 shows a VCMD 2200 capable of TV-AVR state detection and monitoring according to certain embodiments. More specifically, the VCMD 2200 is configured to employ a process referred to herein as HDMI primitive-based state detection (PBSD). PBSD is a process that can be used by a VCMD, e.g., the VCMD 300 shown in FIG. 3, to determine the state of the connected TV-AVR system, e.g., whether or not the VCMD 2200 is in focus on the TV-AVR system 2203, and whether or not the volume of the TV-AVR system is set to an audible level. According to certain embodiments, a VCMD employing PBSD can measure one or more HDMI primitive signals, referred to herein as "HDMI primitives" from the HDMI port 2201 of VCMD 2200 and then determine the state of the TV-AVR system 2203. To further illustrate a VCMD system that can employ PBSD, FIG. 22 shows a VCMD 2200 having an HDMI state detection subsystem 2202, with all other elements of the VCMD removed for the sake of clarity.

PBSD subsystem 2202 includes HDMI state detection module 2219 that is operably connected to both the dual mode controller 2221 and the device controller 2225. Both dual mode controller 2221 and device controller 2225 can be connected to a speech interaction manager (not shown) and ultimately to a voice recognition service (not shown) and are described in more detail above in reference to FIGS. 3-11. PBSD subsystem 2202 further includes an HDMI-port 2201 that can be connected to HDMI-port 2229 of the TV-AVR system 2203, e.g., by way of an electrical interconnect 2223, such as an HDMI cable and the like. In the example shown in FIG. 22, the TV-AVR system 2203 includes an AVR 2204 and a TV 2206. TV 2206 includes and HDMI port 2208, a display 2210, and a TV speaker 2212. AVR 2204 is operably connected to TV 2206 such that in terms of HDMI topology, VCMD 2200 serves as source, AVR 2204 serves as repeater, and TV 2206 serves as sink. AVR 2204 is also connected to one or more external speaker(s) 2214 for providing high-quality sound for content supplied from VCMD 2200.

In some embodiments, a PBSD process running on the HDMI state detection module 2219 can be repetitively and/or synchronously monitoring the state of TV-AVR system 2203 automatically, e.g., several times a second. In some embodiments, the PBSD process can operate asynchronously, e.g., the a PBSD process could be initiated by a command that is sent to the a HDMI state detection module 2219. For example, in response to the detection of a wake-word by VCMD 2200, the dual mode controller 2221 could send a command to HDMI state detection module 2219 to initiate the a PBSD process. Whether operating synchronously or asynchronously, the PBSD process begins when HDMI state detection module reads in one or more HDMI primitives associated with TV-AVR system 2203 from HDMI-Port 2201.

As described in further detail below in reference to FIGS. 23-26, HDMI detection module 2219 can run a PBSD process that determines the TV-AVR state based on the values of one or more of the HDMI primitives.

In FIG. 22, a generalized form of a TV-AVR system is shown but as already noted above in reference to FIGS. 3 and 15, the TV-AVR system can take any form without departing from the scope of the present disclosure.

As described in further detail below, the HDMI state detection module can read in values and/or data associated with several primitives. Example primitives include the hot plug detect primitive (HPD), the high bandwidth digital content protection primitive (HDCP), the extended display identification data primitive (EDID), and the IS_REPEATER primitive (IR).

The HDP primitive is designed to indicate whether another device is connected via an HDMI cable. In some embodiments, the HPD is communicated via a voltage value that is applied to a pin of the HDMI port. If the voltage value on the HPD pin is high, it indicates that another device is connected to the HDMI cable. In some cases, the precise voltage value that is applied to the HPD pin can indicate the power state of the connected device, but this is not generally true for all manufacturers.

EDID describes the media capabilities of the sink device. For example, if the sink device is a TV, as shown in FIG. 22, EDID will describe the TV and the media capabilities of the TV, if the TV is on. For example EDID can include manufacturer name and serial number, product type, phosphor or filter type, timings supported by the display, display size, luminance data and (for digital displays only) pixel mapping data. In some topologies where the AVR is acting as a repeater, like that shown in FIG. 22, if the TV is off, EDID can sometimes describe the AVR and the media capabilities of the AVR. However, in other cases, EDID can become unavailable when connected device(s) that are in an OFF state.

EDID can also carry the physical address information used by the VCMD 2200. Physical address reveals the position of a device in HDMI topology tree. In a complex topology that involves an AVR 2204 and a TV 2206, as shown in FIG. 22, a change in physical address may indicate a change of the power state of TV 2206. For example, an address change from 1.1.0.0 to 1.0.0.0 can mean that the position of VCMD 2200 has been promoted from level 2 to level 1, and that the AVR 2204 became the sink device. This would happen, for example, when the power state of TV is switched to OFF. Similarly, a change from 1.0.0.0 to 1.1.0.0 could signal an opposite scenario, where TV 2206 is switch from OFF to ON and therefore became the sink device again.

HDCP is designed to indicate to a connected content source whether or not there exists a secure media path for digital rights management (DRM) media content to be transmitted to one or more sink devices (e.g., a television). Under the HDCP scheme, to protect DRM content, before the content can be played on a sink device, the device must authenticate to the source. Once authenticated, encrypted content can be sent via the HDMI cable and can be decrypted at the sink. To determine the method of encryption, the sink needs to be aware of the version of HDCP being used by the source. Accordingly, HDMI data being transmitted via the HDMI connection includes an HDCP data element, referred to herein as HDCP_version, that identifies the version of HDCP being used. In addition, HDMI data being transmitted via the HDMI connection includes another HDCP data element, referred to herein as HDCP_auth, that identifies whether or not the sink has been authenticated. In some implementations HDCP_auth can take a binary value, e.g., is set to TRUE if the sink is authenticated and is set to FALSE if the sink is not authenticated. In some cases, the HDCP_version data can include a string that denotes the HDCP protocol version being used. A value of NULL for the HDCP_version therefore indicates a lack of a secure media path between the source and sink devices. In most cases, HDCP_Auth and HDCP_version change together, but some audio visual equipment can keep the value of HDCP_Auth set to true even after the sink device is turned off In such cases, HDCP_version will usually switch to NULL. As such a switch from HDCP_version from non-null to null indicates a switch OFF of the sink, even if the HDCP_Auth value is still true.

In topologies that include an AVR such as that shown in FIG. 22, the value of IR can indicate whether the AVR 2204 is repeating the signal to TV 2206 or not. If not, it indicates that TV 2206 is either disconnected or in OFF state. Combined with changes in physical address, IR can be particularly useful for determining TV state in complex topologies.

Figure 23:
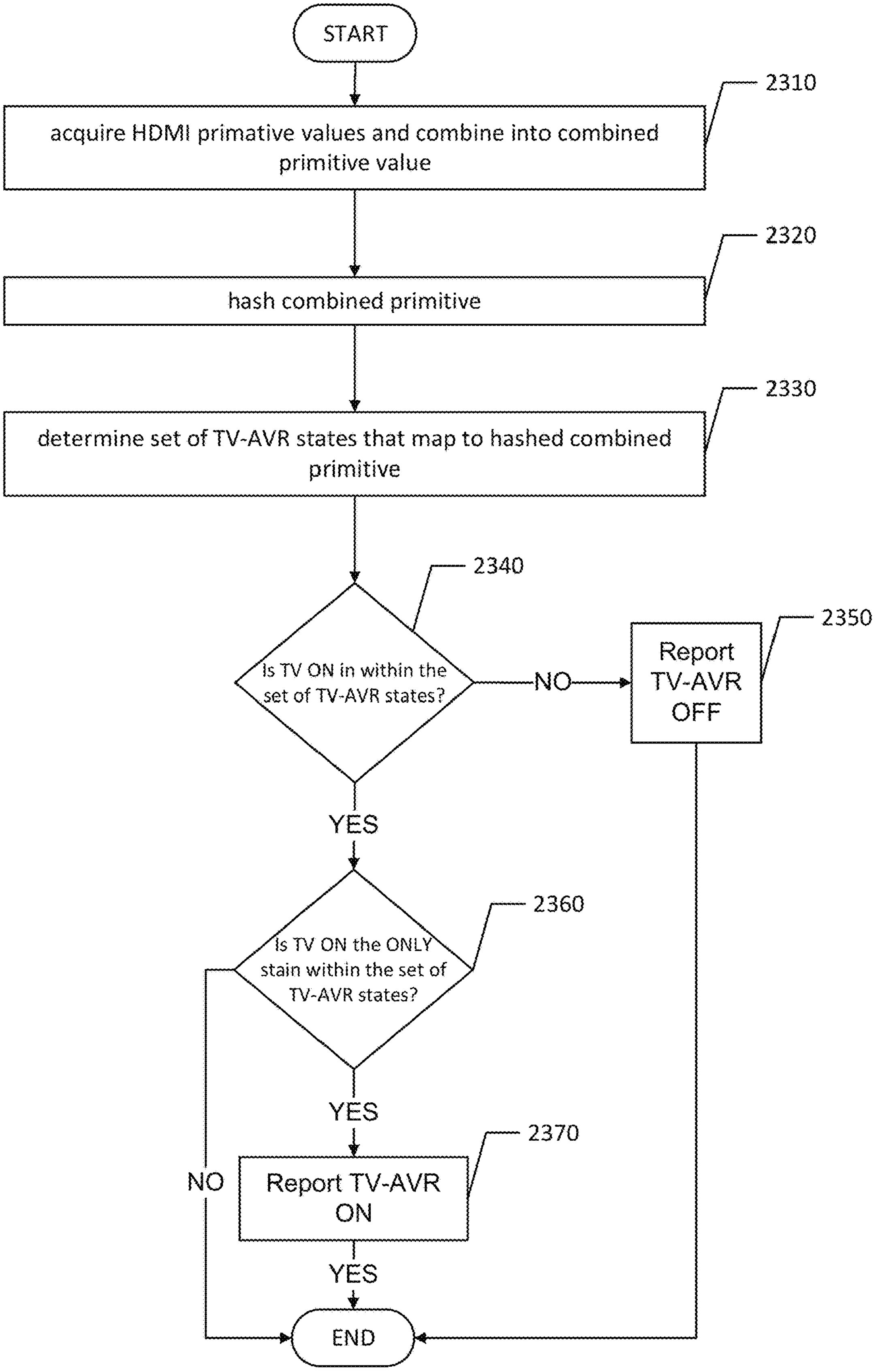
FIG. 23 illustrates one example of primitive-based state detection in accordance with one or more embodiments of the disclosure.

FIG. 23 illustrates one example of PBSD according to certain embodiments. More specifically, the method illustrated in FIG. 23 relies on combined primitive hashes according to certain embodiments. In this technique, during a setup procedure for the VCMD, the values of the primitives HPD, HDCP, EDID, and IS_REPEATER are collected while the components of a user's TV-AVR system are guided through various states. For example, in a TV-AVR system like that shown in FIG. 22, that includes both an AVR 2204 and a TV 2206, the 16 possible states of the TV-AVR system include all combinations between TV power state (ON/OFF), TV input state (VCMD port active/non-VCMD port active), AVR power state (ON/OFF), and AVR input state (VCMD port active/non-VCMD port active). For each of the 16 possible states for the TV-AVR system, the primitive values are combined and then hashed. According to certain embodiments, the hashing can be accomplished by first concatenating the primitive values and running the concatenated results through a cryptographically strong hash, using an incremental hashing function, or any other suitable hashing technique known in the art.

Ideally, the value for the 16 individual combined primitives would lead to a unique hash values and thus, the hash value would uniquely identify the state of the TV-AVR system. In some examples this may not be the case, so one or more embodiments can employ other state detection techniques/logic in addition to in techniques but even if this is the case, test reveal that TV-OFF state can still be reported with high confidence.

FIG. 23 shows a PBSD process according to certain embodiments. The process relies on one or more combined hash values to determine the TV-AVR state as described below. The process may run on a VCMD to determine a state of a display-connected TV-AVR system. For example, in reference to FIG. 22, the PBSD process of FIG. 23 can run on the HDMI state detection module 2219. According to certain embodiments, the HDMI state detection module can include an HDMI ICs or HDMI system-on-a-chip (SOC) that can include one or more processors and computer memory. The PBSD process may run synchronously or asynchronously as described above in a manner similar to SCM as described above.

In step 2310, the HDMI state detection module 2219 can acquire a set of primitive values from an HDMI port that is connected to the TV-AVR system 2203. According to certain embodiments, the set of primitives can be values from primitives such as HPD, HDCP, EDID and IR.

In step 2330, the single hash value is compared to a set of characteristic hash values that were acquired during an initial setup procedure of the VCMD and stored in memory.

In step 2340, HDMI state detection module 2219 determines whether or not the single hash value maps to any stored TV-AVR state that include a TV-AVR ON state. If yes, the method proceeds to step 2350. If no, the method proceeds to step 2350 and reports the TV-AVR system to be in the OFF state. The PBSD process then terminates until the next time the process is called to run to update the TV-AVR system state.

In step 2350, HDMI state detection module 2219 determines whether the TV-AVR ON state is the only state represented in the set of TV-AVR states obtained by matching the single hashed value to the stored characteristic hash values. If no, the PBSD process terminates until the next time the process is called to run to update the TV-AVR system state. If YES, the method reports the TV-AVR system to be in the ON state and then terminates until the next time the process is called to run to update the TV-AVR system state.

Figure 24:
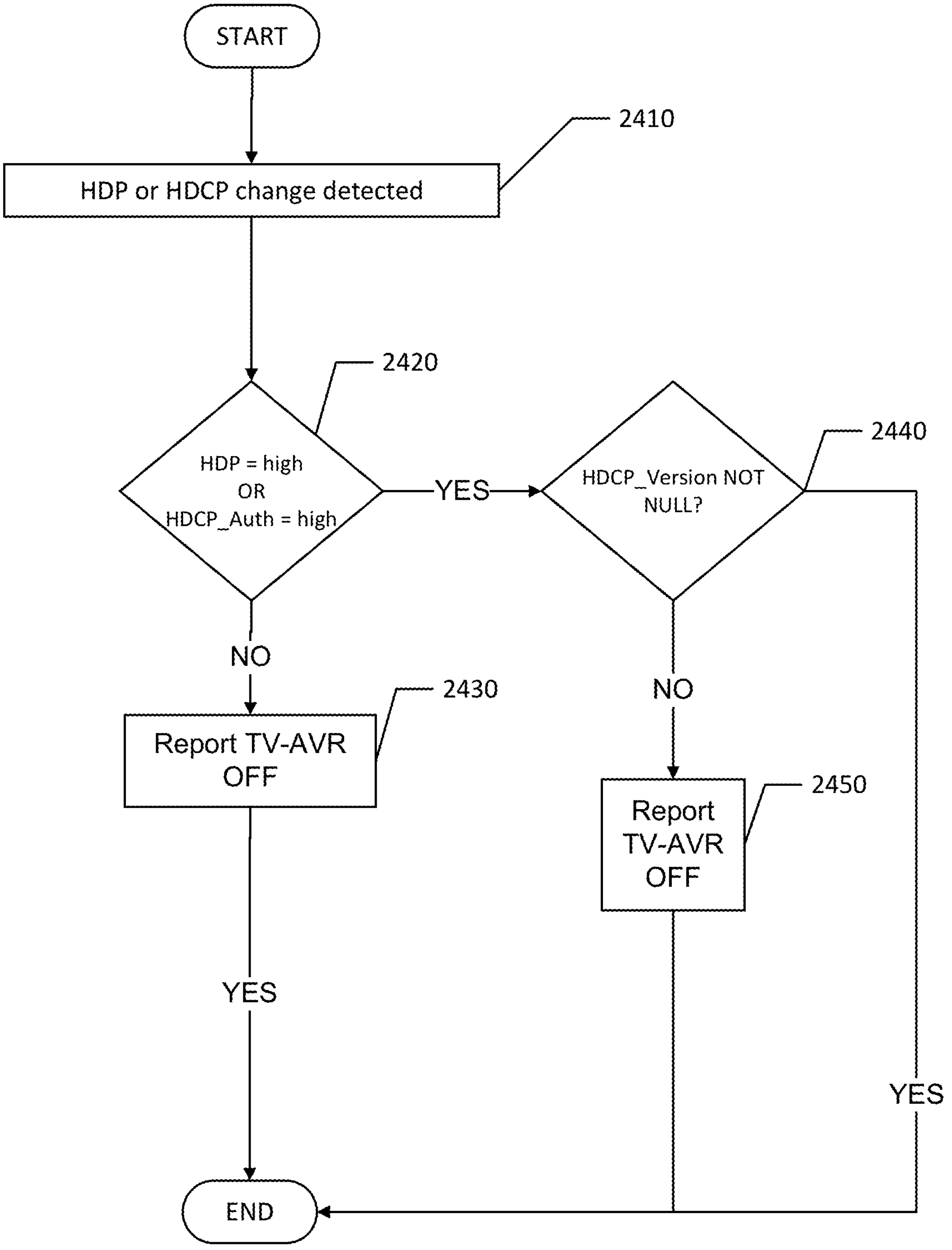
FIG. 24 shows a PBSD process in accordance with one or more embodiments of the disclosure.

FIG. 24 shows a PBSD process according to certain embodiments. The process relies on detecting TV-AVR state using HDP, HDCP_Auth, and HDCP_version. The process can periodically monitor both HPD and HDCP and initiate an update to the TV-AVR state when a change in either of these primitives is detected.

Accordingly, the method begins in step 2410 with a detection by the HDMI state detection module 2219 that a value for either the HPD or the HDCP has recently changed.

In step 2420, the HDMI state detection module 2219 determines if either HPD is in a high state or if HDCP_Auth is in a high state. If neither are in a high state, the method proceeds to step 2430, and reports the TV-AVR system to be in the OFF state. The method then terminates until the next time a change in either HDP or HDCP is detected. If either HPD is high or HDCP_Auth is high, the method proceeds to step 2440.

In step 2440, the HDMI state detection module 2219 detects if the HDCP_Version is not NULL. If the HDCP_Version is NULL, the method proceeds to step 2450, and reports the TV-AVR system to be in the OFF state. The method then terminates until the next time a change in either HDP or HDCP is detected. If the HDCP_Version is not NULL, the method terminates, keeping the previous TV-AVR system state. As before, the method can then run again at a later time if a change in either HDP or HDCP is detected.

The operations described and depicted in the illustrative methods and process flows of FIGS. 1-24 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-24 may be performed.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, at a microphone of a voice-controlled device having an internal speaker, first speech input from a user, wherein the voice-controlled device is operatively connected to a first HDMI port of a television via a second HDMI port of the voice-controlled device, the first speech input including a wakeword;

receiving, at the microphone of the voice-controlled device, a second speech input, the second speech input including information about a movie and an action associated with the movie;

determining, by the voice-controlled device, whether the television is ON or OFF;

if the television is ON:

determining, by the voice-controlled device, that an active HDMI port of the television is not the first HDMI port;

sending data from the voice-controlled device to the television, via IR transmitters of the voice-controlled device, to mute the television;

playing a handover audio message on the internal speaker of the voice-controlled device, wherein the handover audio message indicates to the user that the movie is going to be played on the television;

after playing the handover audio message, sending data from the voice-controlled device to the television, via the IR transmitters of the voice-controlled device, to unmute the television; and sending data from the voice-controlled device to the television, via the IR transmitters of the voice-controlled device, to set the active HDMI port of the television to the first HDMI port;

if the television is OFF:

playing the handover audio message on the internal speaker of the voice-controlled device;

sending data from the voice-controlled device to the television, via the IR transmitters of the voice-controlled device, to turn the television ON; and sending data from the voice-controlled device to the television, via the IR transmitters of the voice-controlled device, to switch the active HDMI port of the television to the first HDMI port;

receiving, at the voice-controlled device, video data associated with the movie; and sending the video data to the television via the first HDMI port and the second HDMI port.

2. The computer-implemented method of claim 1, wherein the determining whether the television is ON or OFF comprises:

generating, by the voice-controlled device and in response to receiving the first speech input from a user, an electrical signal representing a pseudo-random number sequence;

transmitting the electrical signal to the first HDMI port of the television; and detecting, by the microphone of the voice-controlled device, an microphone signal that includes ambient room noise and a pseudo-random audio signal generated by the television from based on the electrical signal.

3. The computer-implemented method of claim 1, wherein the determining whether the television is ON or OFF comprises:

detecting, by the voice-controlled device, a first voltage value of a hot plug detect (HPD) signal from the first HDMI port of the television; and detecting, by the voice-controlled device, data associated with a High Bandwidth Digital Content Protection (HDCP) signal from the first HDMI port of the television.

4. A computer-implemented method, comprising:

receiving, at a microphone of a voice-controlled device having an internal speaker, a first speech input from a user, wherein the voice-controlled device comprises an audio video (AV) port that is operatively connected to an AV port of an AV display device such that an AV connection is operatively established between the voice-controlled device and the AV display device, the first speech input including a wakeword;

receiving, at the microphone of the voice-controlled device, a second speech input, the second speech input including a user command to play content;

determining, by the voice-controlled device, that a power state of the AV display device indicates that the AV display device is an OFF state;

sending, by the voice-controlled device, data associated with at least the user command and the power state to a remote server computer;

receiving, by the voice-controlled device, response data from the remote server computer, wherein the response data comprises:

an indication that the content includes video content;

instructions to turn on the AV display device; and a content source location identifier indicating a content source location for the video content;

based on the instructions to turn on the AV display device, sending data from the voice-controlled device to the AV display device to switch the AV display device to an ON state;

receiving, by the voice-controlled device, content from the content source location; and sending the content to the AV display device via the AV connection.

5. The computer-implemented method of claim 4, wherein sending data from the voice-controlled device to the AV display device to switch the AV display device to an ON state comprises sending an IR signal from the voice-controlled device to an IR receiver that is operably connected to the AV display device.

6. The computer-implemented method of claim 4, further comprising sending data, via an IR signal, from the voice-controlled device to the AV display device to set an active AV input of the AV display device to be the AV port of the AV display device.

7. The computer-implemented method of claim 4, further comprising sending HDMI command data over an HDMI connection of the AV connection to set an active AV input of the AV display device to be the AV port of the AV display device.

8. The computer-implemented method of claim 4, wherein the AV port of the AV display device is an HDMI port and wherein determining that the AV display device is in an OFF state comprises:

detecting, by the voice-controlled device, a voltage value associated with a hot plug detect (HPD) signal from the HDMI port;

detecting, by the voice-controlled device, HDCP data elements received from the HDMI port, the HDCP data elements including an HDCP Auth data element and an HDCP version data element; and determining that the AV display device is in the OFF state based on the voltage value and the HDCP data elements.

9. The computer-implemented method of claim 8, wherein determining that the power state of the AV display device is in an OFF state further comprises:

determining that the power state of the AV display device is the OFF state based on the voltage value, the HDCP Auth data element and the HDCP version data element.

10. The computer-implemented method of claim 8, wherein reporting that the power state of the AV display device is the OFF state is based on a determination that the voltage value is not high and the HDCP Auth data element is not high.

11. A computer-implemented method, comprising:

receiving, at a microphone of a voice-controlled device having an internal speaker, a first speech input from a user, wherein the voice-controlled device comprises a audio video (AV) port that is operatively connected to an AV port of an AV display device such that an AV connection is operatively established between the voice-controlled device and the AV display device, the first speech input including a wakeword;

receiving, at the microphone of the voice-controlled device, a second speech input, the second speech input including a user command to play content;

determining, by the voice-controlled device, that a power state of the AV display device indicates that the AV display device is an OFF state;

receiving, by the voice-controlled device, instructions to turn on the AV display device and a content source location identifier indicating a content source location for the content; and sending, based on the instructions to turn on the AV display device, data from the voice-controlled device to the AV display device to switch the AV display device to an ON state.

12. The computer-implemented method of claim 11, further comprising:

receiving, by the voice-controlled device, content from the content source location; and sending the content to the AV display device via the AV connection.

13. The computer-implemented method of claim 11, wherein sending data from the voice-controlled device to the AV display device to switch the AV display device to an ON state comprises sending an IR signal from the voice-controlled device to an IR receiver that is operably connected to the AV display device.

14. The computer-implemented method of claim 11, wherein the AV port of the AV display device comprises an HDMI port.

15. The computer-implemented method of claim 11, wherein determining that the power state of the AV display device indicates that the AV display device is an OFF state comprises:

detecting, by the voice-controlled device, a first voltage value of a hot plug detect (HPD) signal from the AV port of the AV display device; and detecting, by the voice-controlled device, a null value associated with a High Bandwidth Digital Content Protection (HDCP) signal from the AV port of the AV display device.

16. The computer-implemented method of claim 11, further comprising sending data, via an IR signal, from the voice-controlled device to the AV display device to set an active AV input of the AV display device to be the AV port of the AV display device.

17. The computer-implemented method of claim 11, further comprising sending HDMI command data over an HDMI connection of the AV connection to set an active AV input of the AV display device to be the first AV port of the AV display device.

18. The computer-implemented method of claim 11, further comprising:

detecting, by the voice-controlled device, the AV port of the AV display device that connects the voice-controlled device to the AV display device;

determining that an active AV input of the AV display does not correspond to the AV port of the AV display device; and sending data from the voice-controlled device to the AV display device to set the active AV input of the AV display device to be the AV port of the AV display device.

19. The computer-implemented method of claim 11, wherein an active AV input of the AV display device is automatically set to the AV port of the AV display device that connects the voice-controlled device to the AV display device upon the AV display device switching to the ON state.

20. The computer-implemented method of claim 11, wherein sending the data from the voice-controlled device to the AV display device to switch the AV display device to an ON state includes sending a power on command via HDMI-CEC.

* * * * *